US012014192B2

(12) United States Patent
Riva et al.

(10) Patent No.: US 12,014,192 B2
(45) Date of Patent: Jun. 18, 2024

(54) CRAWLER OF WEB AUTOMATION SCRIPTS

(71) Applicant: Microsoft Technology Licensing, LLC, Redmond, WA (US)

(72) Inventors: Oriana Riva, Redmond, WA (US); Yuanchun Li, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/042,060

(22) PCT Filed: May 25, 2020

(86) PCT No.: PCT/CN2020/092004
§ 371 (c)(1),
(2) Date: Sep. 25, 2020

(87) PCT Pub. No.: WO2021/237394
PCT Pub. Date: Dec. 2, 2021

(65) Prior Publication Data
US 2023/0095006 A1   Mar. 30, 2023

(51) Int. Cl.
*G06F 17/00* (2019.01)
*G06F 3/0483* (2013.01)
(Continued)

(52) U.S. Cl.
CPC ............ *G06F 9/451* (2018.02); *G06F 3/0483* (2013.01); *G06F 3/0484* (2013.01); *G06F 8/38* (2013.01);
(Continued)

(58) Field of Classification Search
CPC ...... G06F 9/451; G06F 3/0483; G06F 3/0484; G06F 8/38; G06F 16/951; G06F 16/953;
(Continued)

(56) References Cited

U.S. PATENT DOCUMENTS 10,083,159 B1    9/2018  Bekmambetov et al.
10,783,064 B1 *  9/2020  Walters .................. G06N 3/044
(Continued)

FOREIGN PATENT DOCUMENTS

CN    110532495 A    12/2019
CN    110781089 A    2/2020
(Continued)

OTHER PUBLICATIONS

Negara, Natalia, and Eleni Stroulia. "Automated acceptance testing of javascript web applications." 2012 19th Working Conference on Reverse Engineering. IEEE, 2012 (Year: 2012).*
(Continued)

*Primary Examiner* — Andrew T McIntosh
(74) *Attorney, Agent, or Firm* — Barta Jones, PLLC

(57) ABSTRACT

For a given input query specifying a task to be performed on a website, the correct sequence of actions (or UI script) is machine learned without having any previous knowledge about the website or the query. To learn the correct UI script, a task agent is created that performs multiple task agent runs comprising different sequences of actions of UI elements on the website (e.g., buttons, text fields, menus, and the like). The states of the webpages are monitored after each action of a UI element is performed. Tasklets are created that include the performed sequences of actions for each task agent as well as their assigned scores, and the correct UI script is chosen from the tasklets based on the scores (e.g., tasklet with the highest score).

20 Claims, 7 Drawing Sheets

(51) Int. Cl.
  G06F 3/0484 (2022.01)
  G06F 8/38 (2018.01)
  G06F 9/451 (2018.01)
  G06F 16/951 (2019.01)
  G06F 16/953 (2019.01)
  G06F 40/20 (2020.01)
  G06F 40/30 (2020.01)
  G06F 40/40 (2020.01)
(52) U.S. Cl.
  CPC .......... *G06F 16/951* (2019.01); *G06F 16/953* (2019.01); *G06F 40/20* (2020.01); *G06F 40/30* (2020.01); *G06F 40/40* (2020.01)
(58) Field of Classification Search
  CPC .......... G06F 40/20; G06F 40/30; G06F 40/40; G06F 9/45512
  See application file for complete search history.

(56) References Cited

U.S. PATENT DOCUMENTS

| | | | |
|---|---|---|---|
| 2012/0116921 | A1 | 5/2012 | Fogel et al. |
| 2012/0131556 | A1* | 5/2012 | Mathur ............... G06F 11/3668 717/125 |
| 2013/0290786 | A1* | 10/2013 | Artzi ................... G06F 11/3684 714/E11.207 |
| 2016/0147645 | A1* | 5/2016 | Kandpal ............. G06F 11/3688 717/124 |
| 2018/0074831 | A1 | 3/2018 | Bowman |
| 2019/0294528 | A1* | 9/2019 | Avisror ............... G06F 11/3688 |
| 2019/0324897 | A1* | 10/2019 | Subramanian ...... G06F 11/3664 |
| 2020/0065123 | A1* | 2/2020 | Yang ....................... G06F 9/455 |
| 2020/0065334 | A1 | 2/2020 | Rodriguez et al. |
| 2020/0379889 | A1* | 12/2020 | Hamid ................ G06F 11/3692 |

FOREIGN PATENT DOCUMENTS

| | | |
|---|---|---|
| KR | 101402146 B1 | 6/2014 |
| WO | 2020047040 A1 | 3/2020 |
| WO | 2020068169 A1 | 4/2020 |
| WO | 2020069387 A1 | 4/2020 |

OTHER PUBLICATIONS

Mesbah, Ali, Arie Van Deursen, and Stefan Lenselink. "Crawling Ajax-based web applications through dynamic analysis of user interface state changes." ACM Transactions on the Web (TWEB) 6.1 (2012): 1-30 (Year: 2012).*
Lin, Jun-Wei, Farn Wang, and Paul Chu. "Using semantic similarity in crawling-based web application testing." 2017 IEEE International Conference on Software Testing, Verification and Validation (ICST). IEEE, 2017 (Year: 2017).*
Milani Fard, Amin, Mehdi Mirzaaghaei, and Ali Mesbah. "Leveraging existing tests in automated test generation for web applications." Proceedings of the 29th ACM/IEEE international conference on Automated software engineering. 2014 (Year: 2014).*
Qi, Xiao-Fang, et al. "Automated testing of web applications using combinatorial strategies." Journal of Computer Science and Technology 32.1 (2017): 199-210 (Year: 2017).*
Narasimhan, et al., "Language Understanding for Text-based Games Using Deep Reinforcement Learning", In repository of arXiv:1506.08941, Sep. 11, 2015, 11 Pages.
Nogueira, et al., "WebNav: A New Large-Scale Task for Natural Language based Sequential Decision Making", In Repository of arXiv:1602.02261, Feb. 6, 2016, 9 Pages.
Pasupat, et al., "Zero-shot Entity Extraction from Web Pages", In Proceedings of the 52nd Annual Meeting of the Association for Computational Linguistics, vol. 1: Long Papers, Jun. 23, 2014, pp. 391-401.
Polozov, et al., "FlashMeta: A Framework for Inductive Program Synthesis", In Proceedings of International Conference on Object-Oriented Programming, Systems, Languages, and Applications, Oct. 25, 2015, pp. 107-126.
Polozov, et al., "LaSEWeb: Automating Search Strategies over Semi-structured Web Data", In Proceedings of the 20th ACM SIGKDD International Conference on Knowledge Discovery and Data Mining, Aug. 24, 2014, pp. 741-750.
Rennie, et al., "Using Reinforcement Learning to Spider the Web Efficiently", In Proceedings of the Sixteenth International Conference on Machine Learning, Jun. 27, 1999, 10 Pages.
Safonov, et al., "End-user Web Automation: Challenges, Experiences, Recommendations", In Proceedings of WebNet, Oct. 23, 2001, 8 Pages.
Schaul, et al., "Prioritized Experience Replay", In Repository of arXiv:1511.05952, Nov. 18, 2015, pp. 1-23.
Scheffler, et al., "Automatic Learning of Dialogue Strategy Using Dialogue Simulation and Reinforcement Learning", In Proceedings of the Second International Conference on Human Language Technology Research, Mar. 24, 2002, 7 Pages.
Shen, et al., "Learning Semantic Representations Using Convolutional Neural Networks for Web Search", In Proceedings of the International Conference on World Wide Web, Apr. 7, 2014, pp. 373-374.
Shi, et al., "World of Bits: An Open-Domain Platform for Web-Based Agents", In Proceedings of International Conference on Machine Learning, Jul. 17, 2017, 10 Pages.
Silver, et al., "Mastering the Game of Go with Deep Neural Networks and Tree Search", In International Weekly Journal of Science—Nature, vol. 529, No. 7587, Jan. 28, 2016, 20 Pages.
Singh, et al., "Reinforcement Learning for Spoken Dialogue Systems", In Proceedings of Advances in Neural Information Processing Systems, Nov. 29, 1999, pp. 956-962.
Thummalapenta, et al., "Automating Test Automation", In Proceedings of the 34th International Conference on Software Engineering, Jun. 2, 2012, pp. 881-891.
Vijaykumar, et al., "Neural-Guided Deductive Search for Real-Time Program Synthesis From Examples.", In Repository of arXiv:1804.01186v1, Apr. 3, 2018, pp. 1-18.
Watkins, et al., "Q-Learning", In Journal of Machine Learning, vol. 8, Issue 3-4, May 1992, pp. 55-68.
Winograd, Terry., "Understanding Natural Language", In Journal of Cognitive Psychology, vol. 3, Issue 1, Jan. 1, 1972, pp. 1-191.
Zhao, et al., "ReCDroid: Automatically Reproducing Android Application Crashes from Bug Reports", In Proceedings of the IEEE/ACM 41st International Conference on Software Engineering, May 25, 2019, 12 Pages.
"Automation Anywhere", Retrieved From: https://web.archive.org/web/20191210052820/https://www.automationanywhere.com/, Retrieved on: Dec. 10, 2019, 11 Pages.
"Blue Prism", Retrieved From: http://web-old.archive.org/web/20190124160025/https://www.blueprism.com/, Retrieved on: Jan. 24, 2019, 5 Pages.
"IMacros", Retrieved From: https://web.archive.org/web/20191228191028/https://imacros.net/, Retrieved on: Dec. 28, 2019, 2 Pages.
"Katalon Studio", Retrieved From: https://web.archive.org/web/20191210230219/https://www.katalon.com/, Retrieved on: Dec. 10, 2019, 5 Pages.
"SeleniumHQ Browser Automation", Retrieved From: https://web.archive.org/web/20190815000000*/https://www.seleniumhq.org/, Retrieved on: Dec. 24, 2019, 4 Pages.
"SpaCy", Retrieved From: https://web.archive.org/web/20191224195458/https://spacy.io/models/en/, Retrieved on: Dec. 24, 2019, 3 Pages.
"Test Complete", Retrieved From: https://web.archive.org/web/20191225150929/https://smartbear.com/product/testcomplete/overview/, Retrieved on: Dec. 25, 2019, 3 Pages.
"UiPath", Retrieved From: https://web.archive.org/web/20191214022951/https://www.uipath.com/, Retrieved on: Dec. 14, 2019, 6 Pages.

(56) References Cited

OTHER PUBLICATIONS

Abbeel, et al., "An Application of Reinforcement Learning to Aerobatic Helicopter Flight", In Proceedings of Advances in Neural Information Processing Systems, Dec. 4, 2006, 8 Pages.

Allen, et al., "PLOW: A Collaborative Task Learning Agent", In Proceedings of AAAI, Jul. 22, 2007, pp. 1514-1519.

Anupam, et al., "Automating Web Navigation with the WebVCR", In Proceedings of the 9th International World Wide Web Conference on Computer Networks, Mar. 1, 2000, pp. 1-22.

Barman, et al., "Ringer: Web Automation by Demonstration", In Proceedings of ACM SIGPLAN International Conference on Object-Oriented Programming, Systems, Languages, and Applications, Nov. 2, 2016, pp. 748-764.

Branavan, et al., "Reinforcement Learning for Mapping Instructions to Actions", In the Proceedings of the 47th Annual Meeting of the ACL and the 4th International Joint Conference on Natural Language Processing of the AFNLP: vol. 1, Aug. 2, 2009, pp. 82-90.

Calikli, et al., "Confirmation Bias in Software Development and Testing: An Analysis of the Effects of Company Size, Experience and Reasoning Skills", In Proceedings of Workshop on Psychology of Programming Interest Group (PPIG), Sep. 19, 2010, 16 Pages.

Cer, et al., "Universal Sentence Encoder", In Repository of arXiv:1803.11175, Apr. 12, 2018, 7 pages.

NETMAG, "5 Ways to Make Your Web Designs More Intuitive", Retrieved From: https://www.creativebloq.com/web-design/5-ways-make-your-web-designs-more-intuitive-91516938, Sep. 28, 2015, 16 Pages.

Desai, et al., "Program Synthesis Using Natural Language", In Proceedings of 38th International Conference on Software Engineering, May 14, 2016, pp. 345-356.

Dickey, Megan Rose., "Google is Bringing AI Assistant Duplex to the web", Retrieved From: https://techcrunch.com/2019/05/07/google-is-bringing-ai-assistant-duplex-to-the-web/, May 7, 2019, 3 Pages.

Etzioni, et al., "A Softbot-Based Interface to the Internet", Published in Journal of Communications of the ACM vol. 37, Issue 7, Jul. 1, 1994, pp. 72-76.

Eugenio, Barbara Di., "Understanding Natural Language Instructions: The Case of Purpose Clauses", In Proceedings of 30th Annual Meeting of the Association for Computational Linguistics, Jun. 1992, pp. 120-127.

Fazzini, et al., "Automatically Translating Bug Reports into Test Cases for Mobile Apps", In Proceedings of the 27th ACM SIGSOFT International Symposium on Software Testing and Analysis, Jul. 16, 2018, pp. 141-152.

Finkel, et al., "Incorporating Non-Local Information into Information Extraction Systems by Gibbs Sampling", In Proceedings of the 43rd Annual Meeting on Association for Computational Linguistics, Jun. 25, 2005, pp. 363-370.

Gulwani, Sumit, "Automating String Processing in Spreadsheets Using Input-Output Examples", In Proceedings of the 38th Annual ACM SIGPLAN-SIGACT Symposium on Principles of Programming Languages, Jan. 26, 2011, pp. 317-329.

Gulwani, Sumit, "Dimensions in Program Synthesis", In Proceedings of the 12th International ACM SIGPLAN Symposium on Principles and Practice of Declarative Programming, Jul. 26, 2010, pp. 13-24.

Gupta, et al., "Model Based Approach to Assist Test Case Creation, Execution, and Maintenance for Test Automation", In Proceedings of the First International Workshop on End-to-End Test Script Engineering, Association for Computing Machinery, Jul. 17, 2011, pp. 1-7.

Gur, et al., "Learning to Navigate the Web", In Proceedings of the 7th International Conference on Learning Representations, May 6, 2019, pp. 1-12.

Han, et al., "Focused Crawling Through Reinforcement Learning", In Proceedings of International Conference on Web Engineering, Jun. 5, 2018, 17 Pages.

Harris, et al., "Spreadsheet Table Transformations from Examples", In Proceedings of the 32nd ACM SIGPLAN Conference on Programming Language Design and Implementation, Jun. 4, 2011, pp. 317-328.

Hasselt, et al., "Deep Reinforcement Learning with Double Q-learning", In the Proceedings of Thirtieth AAAI Conference on Artificial Intelligence, Sep. 22, 2015, pp. 2094-2100.

He, et al., "Deep Reinforcement Learning with an Unbounded Action Space", In Repository of arXiv:1511.04636, Nov. 14, 2015, pp. 1-14.

Hernandez, et al., "Deep Web Crawling: A Survey", In Journal of World Wide Web, Jun. 5, 2018, pp. 1577-1610.

Hupp, et al., "Smart Bookmarks: Automatic Retroactive Macro Recording on the Web", In Proceedings of the 20th Annual ACM Symposium on User Interface Software and Technology, Oct. 7, 2007, pp. 81-90.

Jiang, et al., "Efficient Deep Web Crawling Using Reinforcement Learning", In Proceedings of Pacific-Asia Conference on Knowledge Discovery and Data Mining, Jun. 21, 2010, 12 Pages.

Kocsis, et al., "Bandit Based Monte-Carlo Planning", In Proceedings of the 17th European Conference on Machine Learning, Sep. 18, 2006, pp. 282-293.

Kohl, et al., "Policy Gradient Reinforcement Learning for Fast Quadrupedal Locomotion", In Proceedings of IEEE International Conference on Robotics and Automation, vol. 3, May 2004, pp. 2619-2624.

Kulkarni, et al., "Hierarchical Deep Reinforcement Learning: Integrating Temporal Abstraction and Intrinsic Motivation", In Journal of Advances in Neural Information Processing Systems, Dec. 2016, pp. 1-9.

Lacity, et al., "Robotic Process Automation at Telefonica O2", Published in MIS Quarterly Executive vol. 15, Issue 1, Apr. 2015, pp. 1-19.

Lau, et al., "A Conversational Interface to Web Automation", In Proceedings of the 23nd annual ACM Symposium on User Interface Software and Technology, Oct. 3, 2010, pp. 229-238.

Lau, et al., "Interpreting Written How-to Instructions", In Proceedings of the 21st International Joint Conference on Artificial Intelligence, Jul. 11, 2009, pp. 1433-1438.

Leotta, et al., "Approaches and Tools for Automated End-to-End Web Testing", In Journal of Advances in Computers, vol. 101, Jan. 1, 2016, pp. 193-237.

Leshed, et al., "CoScripter: Automating & Sharing How-to Knowledge in the Enterprise", In Proceedings of the SIGCHI Conference on Human Factors in Computing Systems, Apr. 5, 2008, pp. 1719-1728.

Levenshtein, V.I, "Binary Codes Capable of Correcting Deletions, Insertions, and Reversals", In Journal of Soviet Physics Doklady, vol. 10, No. 8, Feb. 10, 1966, pp. 707-710.

Levine, et al., "End-to-End Training of Deep Visuomotor Policies", In repository of arXiv:1504.00702, Apr. 2, 2015, 12 Pages.

Li, et al., "Here's What I Did: Sharing and Reusing Web Activity with Action Shot", In Proceedings of the SIGCHI Conference on Human Factors in Computing Systems, Apr. 10, 2010, pp. 723-732.

Lin, et al., "Efficient Large-Scale Fleet Management via Multi-Agent Deep Reinforcement Learning", In Proceedings of the 24th ACM SIGKDD International Conference on Knowledge Discovery & Data Mining, Aug. 19, 2018, pp. 1774-1783.

Liu, et al., "Reinforcement Learning on Web Interfaces Using Workflow-Guided Exploration", In Repository of arXiv:1802.08802, Feb. 24, 2018, pp. 1-15.

McCallum, et al., "Automating the Construction of Internet Portals with Machine Learning", In Journal of Information Retrieval, vol. 3, Issue 2, Jul. 1, 2000, pp. 1-46.

Miller, Ron, "Gartner Finds RPA is Fastest Growing Market in Enterprise Software", Retrieved From: https://techcrunch.com/2019/06/24/gartner-finds-rpa-is-fastest-growing-market-in-enterprise-software/, Jun. 24, 2019, 5 Pages.

Mnih, et al., "Human-Level Control Through Deep Reinforcement Learning", In Journal of Nature, vol. 518, Feb. 26, 2015, 13 Pages.

Mnih, et al., "Playing Atari with Deep Reinforcement Learning", In Repository of arXiv:1312.5602, Dec. 19, 2013, 9 Pages.

(56) References Cited

OTHER PUBLICATIONS

"International Search Report and Written Opinion Issued in PCT Application No. PCT/CN2020/092004", dated Dec. 30, 2020, 9 Pages.
Li et al., Kite: Mobile Systems, Applications, and Services, ACM, Jun. 10, 2018, pp. 96-109.
Office Action Received for Chinese Application No. 202080051455.X, mailed on Mar. 9, 2024, 14 pages (English Translation Provided).
Supplementary European Search Report received for EP Application No. 20938141.7, mailed on Jan. 10, 2024, 17 pages.

\* cited by examiner

CRAWLER OF WEB AUTOMATION SCRIPTS

BACKGROUND

Today, web crawling involves semantic and keyword analysis of the text and entities on webpages. While effective when trying to understand the semantics of the text, semantic learning is not effective in trying to understand the actions built into today's websites. For instance, a webpage for renting a car may require a user to fill in an online form by entering text to make a reservation (e.g., name, arriving airport, date of birth, etc.). Conventional web crawlers cannot always understand the action of reserving a car from simply analyzing the text of the form. Instead, the web crawler must recognize that the company providing the webpage rents cars from semantic teaming of the rest of the website.

Understanding the actions on webpages is crucial for a host of operations. Digital assistants, such as CORTANA® developed by the MICROSOFT CORPORATION® headquartered in Redmond, Wash., USA, are becoming more sophisticated and able to understand when users want to perform different actions (e.g., make a dinner reservation, book a flight, order a pizza, etc.) instead of just retrieving information. A user may wish to carry out the same task (e.g., ordering a pizza), with one of the many websites supporting that task (e.g., restaurant A, B, or C). Moreover, Robotic Process Automation (RPA) and Internet of Things (IoT) automation requires devices to not only capture data, but also execute actions without user intervention. As more and more applications move onto the web, their actions must be understood beyond the confines of what semantic learning provides.

Executing actions on the web is largely controlled through UI scripts, which are computer objects created using executable scripting languages to perform dynamic interactions with webpages (e.g., clicks, text entering, scrolling, etc.). Traditional webpages with standard markup language objects (e.g., hypertext markup language (HTML) or extensible markup language (XML)) are largely static documents. UI scripts carry out dynamic actions in a webpage, such as entering purchase information fields, entering a user's name, specifying a particular date for a reservation, or entering a particular street address. Thus, web scripts are frequently used to programmatically drive the UI of a website to execute a human task.

Today, generating and maintaining UI scripts is extremely time consuming. Writing a UI script involves inspecting a webpage's DOM tree to identify all relevant UI elements (e.g., text fields, date selectors, maps, and the like). Some software automation tools simplify the process by offering a "record and replay" interface. A conventional automation tool may generate a UI script for booking a medical appointment on a webpage by selecting daily appointments on the website, selecting a particular medial expertise, finding an open time and date, and picking a facility location. Each of these tasks must be recorded, which is very tedious and requires human interaction.

Trying to automate tasks across numerous different websites that require different web scripts is resource intensive. Add in the fact that the websites are constantly being updated, making conventional record-and-replay automation tools inadequate at modeling the behavior of actions supported by websites without excessively repetitive web crawling, testing, and recording of such scripts, and it becomes quite evident that current tools are inadequate at understanding actions on the web at a level needed for today's digital assistants and web automation applications.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

The embodiments disclosed herein are directed to processes and software tools that use machine learning to generate a correct UI script for a query that requests a particular task be performed on a specific website. All that is needed is an input query and a URL for the website, and the disclosed embodiments are able to learn the most-likely sequence of actions to answer the query. To do so, a task agent is are created to execute different sequences actions on the UI elements (referred to herein as "task agent runs"). For example, task agent runs may click UI buttons, enter text in the text fields, pick dates, click drop-down menus, or interact with any actionable item on the webpage. Each task agent run executes a different combination of the UI elements on the webpages, and after each action on a UI element, the state of the webpage is analyzed to determine whether the action positively or negatively progressed the webpage toward answering the query. Scores are assigned to the task agent runs, and the scores are incremented or decremented with rewards based on the new state of the webpage after an action was taken. For each executed UI element, rewards that update the scores of the task agent are assigned based on the location of the UI element being executed, the location of that UI element relative to previous UI interactions with the webpage, and the similarity between the content on the new state of the webpage and the text of the query. Additionally, the rewards may be weighted based on the action performed or the state of the webpage. The sequences of actions performed by each task agent run and the corresponding scores are collected and stored as "tasklets," and one of the tasklets is selected as the answer UI script to the query based on the scores (e.g., the tasklet with the highest score). The answer UI script may then be used for various uses, such as to automatically perform the task for a user, a business process, IoT device, or the like, to build a knowledge base of actions for search purposes; to test the functionality of the website; or myriad other uses.

BRIEF DESCRIPTION OF THE DRAWINGS

The disclosed examples are described in detail below with reference to the accompanying drawing figures listed below.

DETAILED DESCRIPTION

Figure 1:
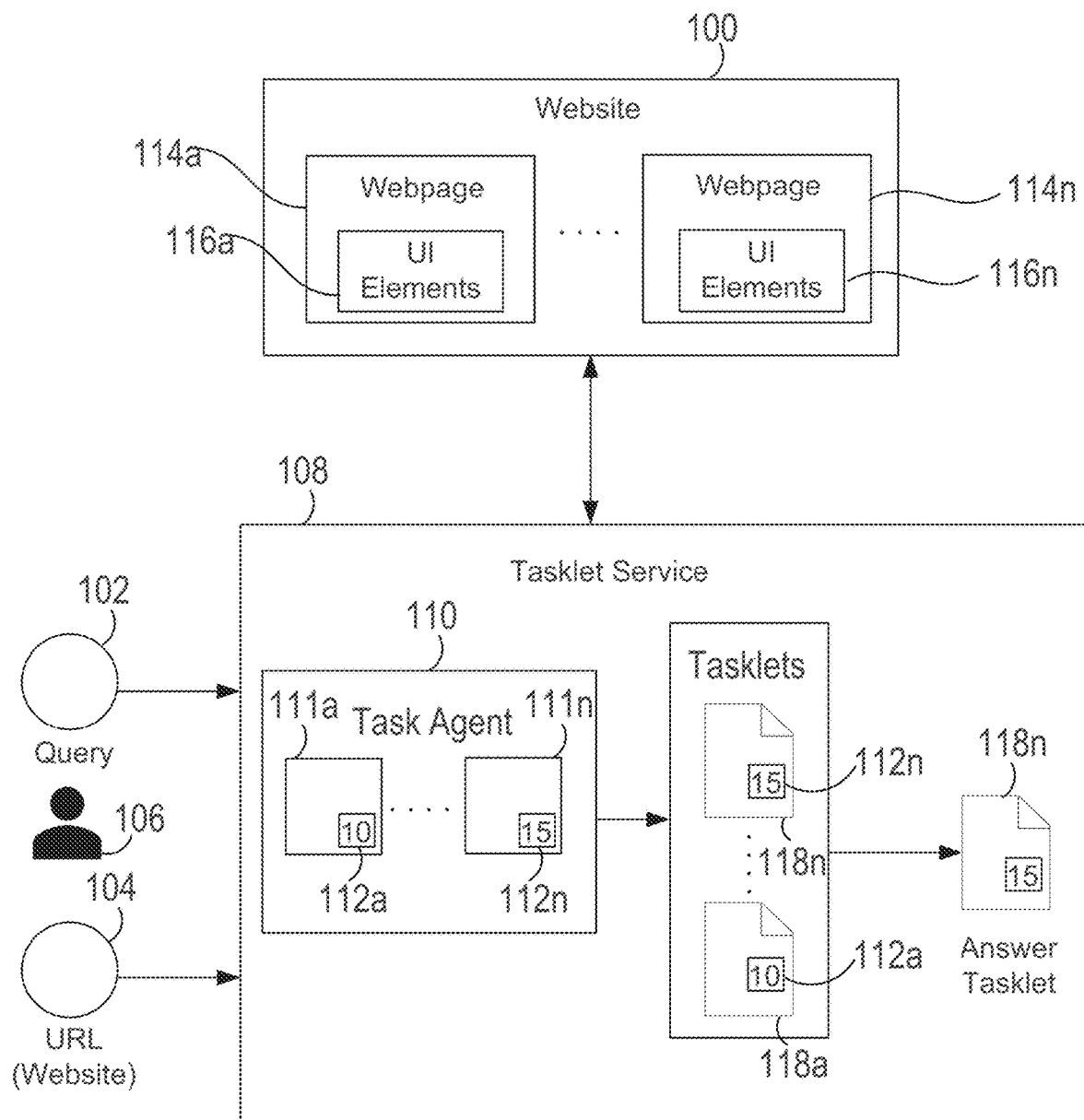
FIG. 1 is a block diagram of a technique for learning a tasklet for performing a sequence of actions on a website to answer a query, according to some of the disclosed embodiments.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

In general, embodiments and examples disclosed herein focus on an automated approach to generate UI scripts for a website to learn the correct actions for answering an input query. The disclosed only need two inputs: (1) a user query that describes a task (e.g., a natural language query), and (2) a uniform resource locator (URL) of a website to crawl. Using only these two inputs, a task agent is created that accesses the website and interacts with the UI elements thereon in different execution instances, meaning that a single task agent performs different sequences of interactions and engagement with the UI elements on the website.

For the sake of clarity, this disclosure refers to these different sequences as "task agent runs." Task agent runs are different sequences of actions performed on the UI elements of webpages by a task agent. For example, one task agent run may include the task agent performing actions of navigating to a webpage for booking hotels, picking a date, entering a name, selecting a hotel, picking a room type, and clicking a submit button. Another task agent run may include the task agent performing actions of navigating to the webpage for hooking hotels, clicking contact link, entering text in an e-mail request text field, and clicking a send button. Myriad different sequences exist and need not be exhaustively discussed herein. To clarify, task agent runs represent different sequences of actions performed by a task agent on UI elements of webpages.

Running scores are assigned for every execution of the agent, scoring the different states of the website relative to the user query after different UI elements are engaged. For instance, the task agent runs may be positively scored for actions that drive the website closer to completion of the task of the user query, or negatively scored for actions that drive the website further from the completion of the task (e.g., navigating to a completely unrelated webpage). All executed sequences of actions may then be ranked based on their scores to identify which one performed best, and the highest ranked task agent run is selected as answering the user's query. Other than the user query and the URL, no additional inputs are needed, allowing the disclosed embodiments to learn the actions of a given website automatically and without resource-intensive record and replay software.

The disclosed embodiments generate sequences of executable UI scripts for web tasks called "tasklets." A tasklet is a collection of UI element actions that form a web task. And "UI elements" refer to actionable objects on a webpage. Examples of UI elements include, without limitation, buttons, menus, text fields, date selectors, hyperlinks, image uploads, or any other action that may be performed on a webpage. For example, reserving a hotel room in a particular city may have a tasklet comprising: navigating to the hotel's website, clicking a reservation page; selecting a check-in date; selecting a check-out date; entering the user's name, address, and phone number; accepting terms and conditions; confirming the reservation; providing payment information; and confirming payment. Together, these actions form a single tasklet that may be sequentially performed by an agent. Additionally, when trying to learn the correct sequence of actions for booking the hotel, an agent performs different sequences of actions. The task agent run is scored after each action it performs, based on whether the action produced a new state in the website related to the query or not. For example, an agent that runs through the above sequence related to the hotel booking will be assigned a higher score than another agent that clicks on webpages for the hotel that are not related to reserving a room (e.g., a contact page, a frequently asked questions page, a pet policy page, etc.). The agent scores are analyzed to determine which particular tasklet (or sequence of actions) properly answered the user query. This allows the disclosed embodiments to effectively learn the correct tasklet for a given user query by analyzing what happens to the website when the task agent interacts with various UI elements to perform different tasklets.

The disclosed embodiments model the problem of automatically generating tasklets as a "state space search" problem. A website is represented as a set of states made up of its various webpages and actions made up of the various UI elements (e.g., buttons, text fields, menus, etc.). An agent searches the space by taking some actions to reach a goal state (e.g., task completion). Actions are rewarded based on their progress towards completion. Resultant tasklets are generated, and the task agent run scores are used to rank the tasklets and identify the correct one for a user query. Alternatively, all task agent runs are scored, regardless of whether they reach a goal of the user query, and the scores of the task agent runs are used to rank the sequences of actions that correctly answer the user query.

In some examples, the user input is a natural language (NL) description of a task. For example, a user input may be the following task description "Estimate ride fare from 1st Ave, New York to Central Park." In addition to this NL description user input, a URL of a popular ride-sharing application may be provided. The disclosed examples identify the pick-up and drop-off locations in the user input (e.g., through semantic learning) and generate a task agent that begins executing different actions on the ride-sharing URL. For instance, the task agent may discover a tasklet that inputs the pick-up and drop-off locations in corresponding text fields for such information on a webpage for requesting a car, click a "request estimate" button, and then select an option from a price-list page that differentiates between different classes of cars (e.g., share, economy, premium, spoil utility vehicle, etc.). Other task agent runs may discover different sequences of actions. And the resultant scoring of each task agent run reveals which tasklet is most likely to satisfy the user's NL query.

Unlike existing tools that require one or multiple demonstrations of a task, the disclosed embodiments do not require any previous demonstrations. Instead, an agent is created to interact with different UI elements, and scores are assigned to the agent based on the state of the website, relative to the user's query, after each action. This framework allows the correct tasklet to reveal itself, instead of having to use previous demonstrations. Additionally, describing tasks in a natural language (e.g., writing a sentence in English) makes the disclosed embodiments accessible to non-technical users. Moreover, by accepting general task descriptions that are independent of a target website, the disclosed embodiments are able to "crawl" tasklets for a given task across many sites.

To aid the reader, the disclosed embodiments refer to actions being performed by the task agent on webpages and websites. Alternatively, the disclosed task agents and task agent runs may execute in computer UI environments that are not necessarily web-based. Instead of webpages, the disclosed embodiments may create task agents that crawl and perform actions on computer applications on a client device, e.g., a word-processing application, an e-mail application, a spreadsheet application, a stock trading application, etc. Thus, embodiments may perform the same task agent runs on local applications of a client computing device.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 is a block diagram of a technique for learning a tasklet for performing a sequence of actions on a website 100 to answer a query 102, according to some of the disclosed embodiments. As illustrated, a user 106 submits the query and a URL 104 of the website 100 to a tasklet service 108. The user 106 may be an end user requesting performance of an action (e.g., through a digital assistant). Alternatively, the user 106 may be a developer looking to test or instruct a device (e.g., IoT, robot, software automation, etc.) to perform a particular action. For example, a developer may submit the query 102 through a tool for process automation on the client computing device 100. Further, the user 106 may be artificial intelligence (AI) code that is configured to submit action queries.

The tasklet service 108 creates a task agent 110 to access the website 100 and interact with its various webpages 114a-n in different sequences of actions, shown as task agent runs 111a-n. The webpages 114a-n have numerous UI elements 116a-n, such as buttons, text fields, date selectors, drop-down menus, image loaders, or any number of UI elements that are interactive. The task agent 110 engages different combinations of these UI elements 116a-n, and the state of the webpages 114a-n is assessed after the UI elements 116a-n are engaged to determine scores 112a-n (otherwise called "rewards" herein) that are assigned to the task agent runs 111a-n. In some examples, the scores 112a-n are assigned based on whether the engagement of a particular UI element 116 produced a state of the webpage 114 that is related to the query 102. If so, the score 112 is incremented, but if not, the score 112 is decremented. To illustrate these scores, task agent run 111a is shown achieving a score of "10" and task agent run 111n, which is a different sequence of actions, achieves a score of "15," indicating that the latter executed actions that produced states of webpages 114a-n that likely fulfilled the query 102.

Eventually, after the task agent runs 111a-n complete their interactions with the UI elements 116 of the webpages 114, the sequence of actions performed on the UI elements 116a-n are recorded as tasklets 118a-n. In some examples, each of the tasklets 118a-n include a record of the UI element actions performed by one of the task agent runs 111a-n and the corresponding score 112a-n that was achieved. The tasklets 118 are then be ranked according to the assigned scores 112a-n and used to select an answer tasklet that may be returned to the user 106. In the depicted example, the answer tasklet ends up being tasklet 118n because it has the highest score 112n of 15.

As previously discussed, some of the disclosed examples only require the query 102 and a URL for the website (URL 104). These may be submitted by a user 106 from any one of the client computing devices discussed in more detail below (e.g., a mobile phone, tablet, laptop, or the like) to a tasklet service. In some embodiments, the query 102 is an NL query that is typed, spoken, or otherwise submitted by the user 106, e.g., to an application, search engine, or digital assistant on the client computing device. Alternatively, the query 102 may be submitted as a collection of search keywords, instead of an NL query. Also, embodiments are not limited to answering queries 102 from users 106. Though not shown, the query 102 and the URL 104 may be automatically submitted by a computing device.

In other embodiments, a user submits the query 102 and the URL 104, and the resultant UI script (e.g., the answer tasklet discussed below) generated to fulfill or answer the query 102 may be performed for the user 106. In some specific embodiments, IoT devices, autonomous vehicles, robots, or other devices may be programmed to the submit the query 102 and the URL 104, and the resultant UI script (e.g., the answer tasklet discussed below) generated to fulfill or answer the query 102 may be performed for the IoT device, autonomous vehicle, robot, or other device.

Figure 2:
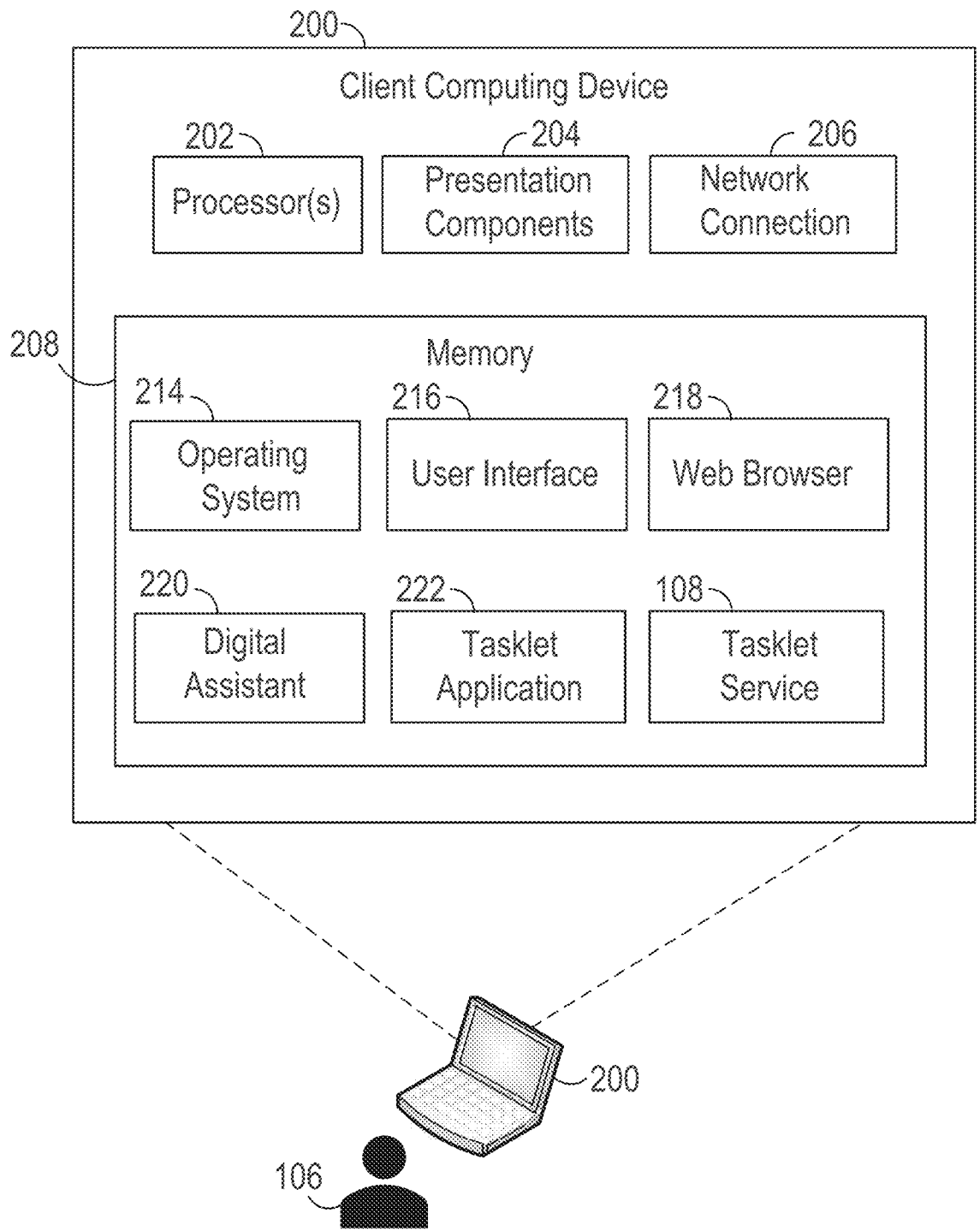
FIG. 2 is a block diagram illustrating a client computing device for use in initiating tasklet generation, according to some of the disclosed embodiments.

FIG. 2 illustrates an example of a client computing device 200 for use in initiating tasklet generation, according to some of the disclosed examples. The client computing device 200 may be any computer, handheld, or processing device executing instructions (e.g., as application programs, operating system functionality, or both) to implement the corresponding operations and functionality described herein. The client computing device 200 may take the form of a personal computer, laptop, virtual-reality headset, mobile tablet, smartphone, or the like. Other examples may incorporate the client computing device 200 as part of a multi-device system in which two separate physical devices share or otherwise provide access to the illustrated components of the client computing device 200. While the client computing device 200 is depicted as a seemingly single device, multiple client computing devices 200 may work together and share the depicted device resources.

In some examples, the client computing device 200 has one or more processor(s) 202, presentation components 204, a network connection 206, and computer-storage memory 208. The processor 202 may include any number of processing units that are programmed to execute computer-executable instructions for implementing aspects of this disclosure. In some examples, the processor 202 is programmed to execute instructions such as those illustrated in the other drawings discussed herein. In some examples, the processor 202 represents an implementation of analog techniques to perform the operations described herein.

The presentation components 204 are configured for presenting information on the computing device 200. Examples of displays include, without limitation, computer monitors, televisions, projectors, touch screens, phone displays, tablet displays, wearable device screens, televisions, speakers, haptics, and the like.

The computer-storage memory 208 includes any quantity of memory devices associated with or accessible by the client computing device 200. Computer-storage memory 208 may take the form of the computer-storage media references below and operatively store computer-readable instructions, data structures, program modules and other data for the client computing device 200 to store and access instructions configured to carry out the various operations disclosed herein.

Computer-storage memory 208 may include memory device in the form of volatile and/or nonvolatile memory, removable or non-removable memory, data disks in virtual environments, or a combination thereof. And computer-storage memory 112 may include any quantity of memory associated with or accessible by the client computing device 200. Examples of client computing device 200 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices, memory wired into an analog computing device; or any other medium for encoding desired information and for access by the display 108.

The computer-storage memory 208 may be internal to the client computing device 200 (as shown in FIG. 2), external to the client computing device 200 (not shown), or both (not shown). Additionally or alternatively, the computer-storage memory 208 may be distributed across multiple client computing devices 200 and/or servers, e.g., in a virtualized environment providing distributed processing. For the purposes of this disclosure, "computer storage media," "computer-storage memory," "memory," and "memory devices" are synonymous terms for the computer-storage memory 208, and none of these terms include carrier waves or propagating signaling.

Figure 3:
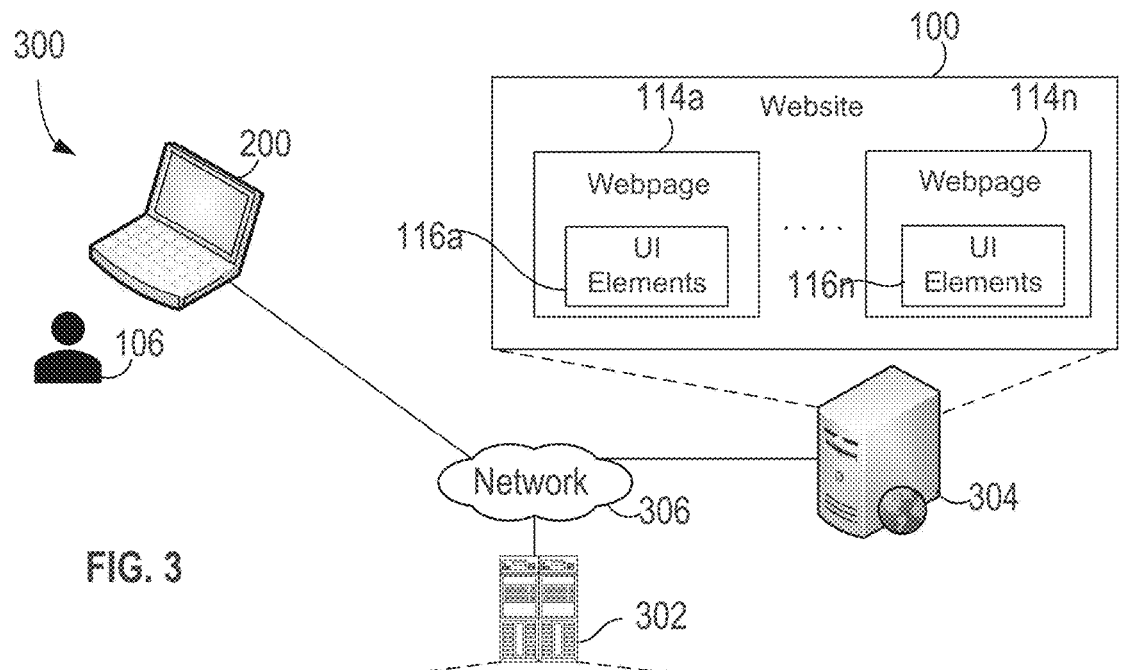
FIG. 3 is a block diagram illustrating a networking environment for the facilitating tasklet generation, according to some of the disclosed embodiments.
Figure 3:
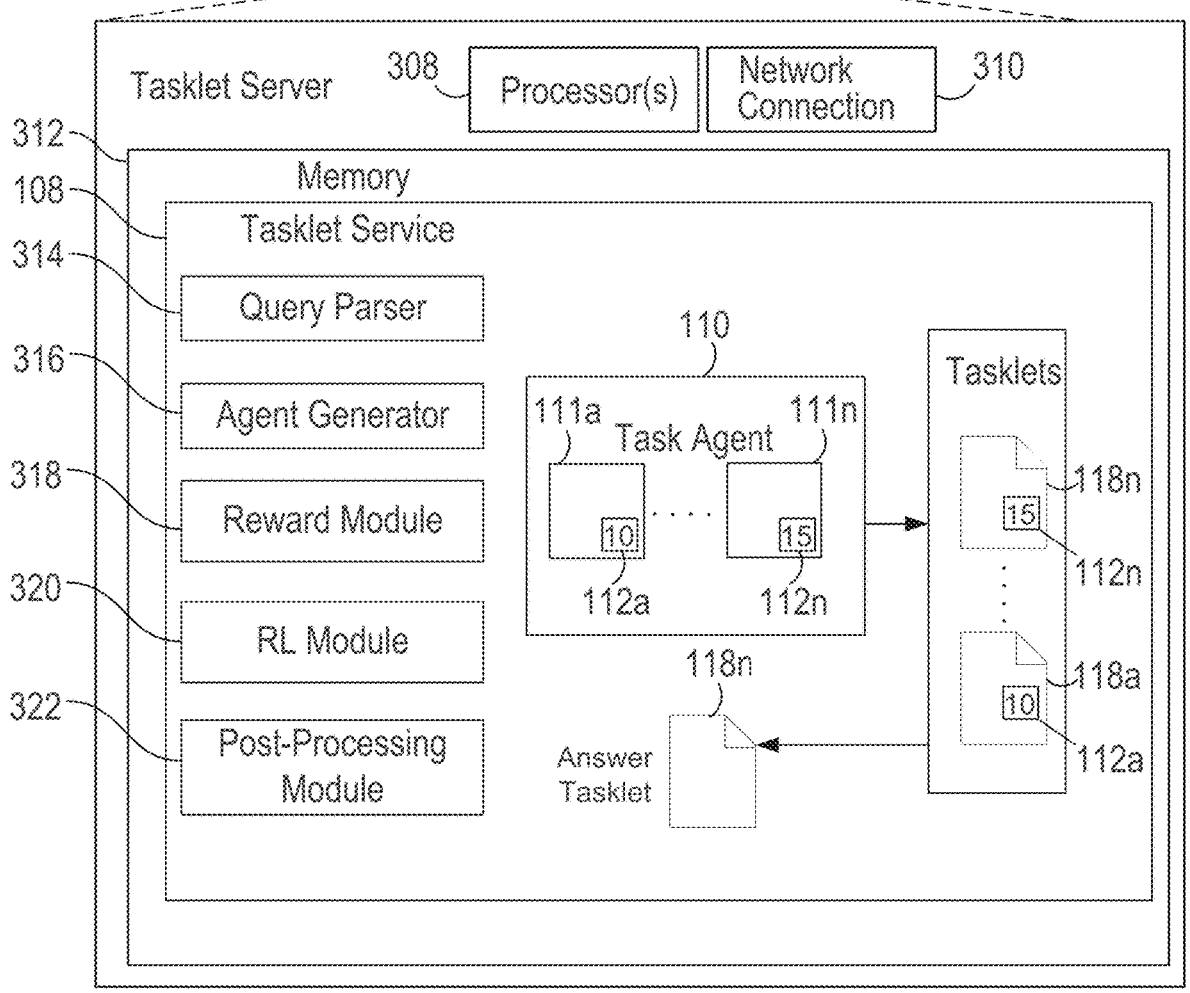

In some examples, the computer-storage memory 208 stores executable computer instructions for an operating system (OS) 214, a user interface (UI) 216, a digital assistant 218, a web browser 218, a tasklet application 220, and the tasklet service 108. Alternatively, the tasklet service 108 is hosted on a remote server, as shown in FIG. 3.

The OS 114 provides an operational environment for the client computing device 200, and the user interface 216 provides graphics, audio, and/or haptics through the presentation components 204. The web browser 218 provides access to the World Wide Web. Operationally, a task agent 110 is generated and accesses the URL 104 submitted by the user 106 using the web browser 218. The generated task agent 110 performs multiple task agent runs 111a-n, or sequences of actions on a website 100. For example, one task agent run 111a may include actions on UI elements 116 A, B, C, and another task agent run 111b may include actions on UI elements 116 C, D, E, and F.

The digital assistant 220 is a virtual assistant on the client computing device 200 interacts with the user 106, providing audio or visual prompts for the user to submit different queries. For example, the digital assistant 220 may take the form of the CORTANA® assistant developed by the MICROSOFT CORPORATION®. In some examples, the digital assistant 220 is capable of receiving voice commands and audio questions. For instance, the user 106 may ask the digital assistant 220 questions, and the digital assistant 220 searches for relevant information related to the question and presents relevant search results. Additionally or alternatively, the digital assistant 220 receives text commands and queries. In operation, the digital assistant 220 may be configured to convert speech of the user 106 to text and formulate a query from the converted text. Or the digital assistant 220 may respond to the NL queries, or questions, submitted by the user 106, either verbally or via a text input. Specific to the disclosed embodiments, the query 102 and the URL 104 used to start tasklet generation may be submitted to the digital assistant 220 as a NL query or as a collection of keywords, either through a text input or via an audio input (e.g., when a user speaks the query).

The tasklet application 222 is a client-side application that receives the query 102 and the URL 104 and provides both to the tasklet service 108. In some embodiments, the tasklet service 108 resides on the client computing device 200, as shown in FIG. 2 with the tasklet service 108 being part of the tasklet application 222. Alternatively, the tasklet service 108 may be operated on a remote server, which is depicted in FIG. 3. For the sake of clarity, the functionality of the tasklet service 108 is described in more detail below relative to FIG. 3.

FIG. 3 illustrates a block diagram of a networking environment 300 for the facilitating tasklet generation, according to some of the disclosed embodiments. The networking architecture 300 involves the client computing device 200, a tasklet server 302, and a web server 304, all of which communicate with each other via network 306. Networking architecture 300 is merely an example of one suitable networking environment and is not intended to suggest any limitation as to the scope of use or functionality of the present invention. Neither should networking architecture 300 be interpreted as having any dependency or requirement related to any single component or combination of components illustrated therein.

Network 306 may include any computer network or combination thereof. Examples of computer networks configurable to operate as network 306 include, without limitation, a wireless network, landline, cable line, digital subscriber line (DSL), fiber-optic line, local area network (LAN), wide area network (WAN), metropolitan area network (MAN), or the like. Network 306 is not limited, however, to connections coupling separate computer units. Rather, network 306 may also comprise subsystems that transfer data between servers or computing devices. For example, network 306 may also include a point-to-point connection, the Internet, an Ethernet, an electrical bus, a neural network, or other internal system. Such networking architectures are well known and need not be discussed at depth herein.

The tasklet server 302 and the web server 304 may be any type of server or remote computing device. The web server 304 hosts the website 100 being requested by the URL 104 with the query 102. The web server 304 stores and answers requests for the various webpages 114a-n. In operation, the web server 304 provides the created task agent 110 access to the web pages 114a-n of the website 100, and the task agent 110 performs multiple task agent run 111a-n that include different sequences of actions, which are scored with rewards assigned after each action (shown as scores 112a-n). Component-wise, the web server 304 includes a processor, memory, and network connection, but they are not shown for the sake of clarity.

The tasklet server 302 includes one or more processor(s) 306, a network connection 310, and computer-storage memory 312. In some examples, the tasklet service 108 is stored in the computer-storage memory 312 of the tasklet server 302. The tasklet service 108 includes a query parser 314, an agent generator 316, a reward module 318, a reinforcement learning (RL) module 320, and a post-processing module 322. As discussed in more detail below, these components 314-322 provide executable instructions to generate the task agent 110 for interacting with the UI elements 116a-n of the webpages 114a-n, assigning scores 112a-n to the task agent runs 111a based the different states of the webpages 114a-n, and ranking tasklets 118a-n based on the assigned scores 112a-n of the task agent runs 111a-n. Alternatively, the tasklet service 108 may be a client-side application, with the query parser 314, the agent generator 316, the reward module 318, the RL module 320, and the post-processing module 322 all stored and executed on the client computing device 200.

In operation, tasklet generation starts when the user 106 submits the query 102 and the URL 104. The query 102 requests a task be performed on the website 100 indicated in the submitted URL 104. For example, the query 102 may be "Make a reservation for 4 tonight for Italian food," and the URL may be www.reservationonline.com. The user 106 may enter such query 102 and URL 104 either directly into the tasklet application 222 or through the digital assistant 220. Regardless of how they are entered, the query 102 and the URL 104 are transmitted to the tasklet server 302 for processing by the tasklet service 108.

Once the query 102 and the URL 104 are received by the tasklet service 108, the query parser 314 parses the user query 102 and extracts syntactic and semantic information. In particular, the query parser 314 may recognize different types of text in the query 302, such as, for example, an address; a type of food (e.g., Italian, Indian, Mexican, etc.); a name; a location; an event; an activity; or the like. In some examples, the query parser 314 assigns text parameters to the parsed text of the query 102, and the text parameters designate recognized text in the query 302. For example, the query "Estimate ride fare from 1st Ave, New York [start location] to Central Park [end location]" may be tagged with the text parameters shown in brackets to the NL query. Each text parameter is an entity-type classification of particular text of the query 102. Developers may freely decide how to annotate their parameters (e.g., the annotations "pickup" or "origin" would work as well in the above example).

The agent generator 314 creates the task agent 110 to perform task agent runs 111a-n to search the target website 100 of the URL 106 and find one or more tasklets that satisfy the query 102. The task agent 110 is created to navigate to the website 100 and engage different sequences of UI elements 116 in the webpages 114a-n. For example, one task agent run 111a may open a reservation page of a ride-share application, enter a pick-up location, and then click a button to estimate a fare, resulting in an error page being displayed due to a lack of drop-off location being entered. While another task agent run 111b may open the reservation page, enter a pick-up location, enter a drop-off location, and then click a button to estimate a fare, resulting an actual estimate of the proposed ride being presented.

After each UI element 116a-n interaction, the reward module 318 assigns a score (or reward) to the task agent 110 based on the state of the webpage 114a-n after the action. In some examples, rewards are assigned based on how closely the updated state of the webpage 114a-n mirrors or responds to the text of the query 102. FIG. 3 shows multiple task agent runs 111a and 111n having different scores 112a and 112n, respectively. In some examples, the scores 112a-n of the task agent runs 111a-n are implemented as a running counter based on the stats of the webpages 114a-n after each UI element 116a-n interaction. Interactions that produce webpages 114a-n being semantically aligned with the query 102 are considered positive, and thus the score is incremented. Whereas, interactions that produce webpages 114a-n that have nothing or less to do with the user query 102 than a preceding webpage 114a-n are considered negative, and thus the score is decremented. In the above two examples, task agent run 111a would be incremented because it resulted in a webpage that displayed an estimated fare (which was pan of the query 102). But task agent run 111b would be decremented because it resulted an error that did not include an estimated fare.

Put another way, the website 100 is viewed as a finite state machine <W,A>, where W is the set of states and A is the set of actions that can lead to state transitions. A state w ∈ W corresponds to a webpage 114 in the website 100, where w0 is the start page. Each w may be represented by its DOM tree (Wdom) and a screenshot Wscreen. Each node in Wdom corresponds to a UI element 116 (e) in the webpage uniquely identified by one or multiple UI element attributes (e.g., Xpath, X,Y coordinates, DOM identifiers, etc.). From the DOM tree various properties of the UI elements 116 (e) are extracted, including: (1) the UI element's location (eloc), represented as a rectangle in the page; (2) whether the element is "clickable" or "editable" (etype), as inferred from various markup tags (e.g., <p> for text elements, <img> for images, <button> for elements accepting click events, etc.); (3) whether the element has associated some text ($e_{text}$) inferred using a combination of HTML attributes (e.g., text, placeholder, value, etc.), as not all may be available; and (4) font size (efont). Webpages 114a-n with different content or DOM trees are regarded as different states in <W,A>.

Aw ⊆ A is the set of actions that can be executed in w ∈ W. Actions may lead to state transitions. For instance, clicking a link may redirect to another page or typing text into a text field can lead to a content change in the current page. Some specific embodiments constrain the action space to the following four categories of actions.

(1) click(e): clicking on element e, where e must be a clickable UI element, such as a button, a hyperlink, etc.;

(2) select(e,i): selecting the i-th child of element e, wherein e is a <select> DOM element, and i is smaller than the number of options in e (e.g., selecting an item from a menu);

(3) type(e,t): typing text t into e, where e is an editable UI element (e.g., text field) and t one or more words in q; and (4) enter(e): submitting the content in e by pressing the "Enter" keyboard key, where e must be an editable UI element.

Finally, a tasklet(q,w) 118 may then be defined as a sequence of actions <$a_1$, $a_2$, . . . > in w that can complete the task described in q.

Searching the state space of an application as a website can use many algorithms. The search algorithm needs to work in an exploration-exploitation manner where information on the website is collected by randomly exploring it to guide the selection of future actions. To guide the task agent towards completion, rewards are returned every time an action is executed. One possible implementation of a search agent for websites is based on reinforcement learning. Other implementations can use Hill Climbing or Monte Carlo tree search.

In standard reinforcement, at each time step (i), a task agent 110 selects an action $a_i$ ∈ A based on the current state $s_i$ ∈ S. In response, the website 100 returns to the task agent 110 a new state $s_{i+1}$ and a reward ($s_{i+1}$, ai). The goal of the task agent 110 is to learn by trial and error how to maximize the cumulative reward R of the scores 112a-n. In some examples, the execution environment for the task agent 110 consists of a web browser instrumented to execute UI actions. At initialization, the web browser loads the URL 104 and passes the initial state w0 and the set of possible actions $A_{w0}$ to the task agent 110. As previously discussed, the reward module 318 assigns the task agent 110 a positive or negative reward upon taking an action. One key insight of this design is that progress toward completing a task of the query 102 is recognizable based on the current task description, the current state (e.g., the content in the current webpage 114), and the sequence of actions executed so far by a task agent 110 without the need to know the expected result of the task.

In some examples, the reward module 318 assigns rewards based on the following factors, action locality, action directionality, and task-webpage similarity. Action locality refers to the location of UI elements 116 relative to each other. When interacting with a webpage 114, users usually focus on a small portion of the page at the time, rather than jumping around. For example, in the task "find cookie recipes," the task agent 110 may try to enter the word "cookie" in a text box and click the search button next to it. The task agent 110 should not click a link "Cookies, Terms & Privacy" at the bottom of the page. Thus, the location of UI elements 116a-n relative to each other is considered by the reward module 318 and influences the assigned scores 112. The closer the UI elements are to each other being more indicates a positive state, resulting in a higher score. The farther the UI elements 116 are to each other indicates a negative state, resulting in a lower score.

Action directionality refers to the direction that UI element interaction progresses. As websites are designed for humans, the placement of DOM elements is usually optimized to aid reading and task completion. For example, in Western languages, humans usually read a page from left to right and from top to bottom (also called Z and F patterns), hence subsequent actions to carry out a web task tend to flow accordingly. Therefore, the reward module 318 may assign rewards or increment the scores 112 based on the positioning of UI elements in relation to the consumption pattern of a particular language of a webpage 114. For example, a webpage 114 in English may be scored based on engaged UI elements 116 being positioned from left to right and top to bottom.

The task-webpage similarity takes into account whether the new state of the webpage 110, after a particular UI element 116 interaction, contains textual content and/or actions that also have associated some classifying text (e.g., a button label) that matches or is semantically similar to the language of the query 102, such as to the text words, parameters, or parameter annotations of the query 102. In other words, actions for engaging UI elements 116 that produce webpages 114 with text similar to or the same as in the query 102 are incremented in score. For example, a task agent run 111 trying to estimate a rideshare may be incremented if an action it takes produces a webpage with a UI button labeled "Click to Estimate."

In some embodiments, the reward module 318 maps the location of each executed UI element 116 action, the directionality of each executed UI element 116 (e.g., in relation to a previous element 116), and task-webpage similarity as "task progress indicators." Given the query 102 (q), one or more parameters (p), annotations of the parameters (pann), the current webpage 114 (w), and the sequence of actions so far executed $a_s = <a_1, a_2, \ldots, a_k>$, the following is defined.

(1) num_ld: the number of long-distance action pairs in as, meaning subsequent actions whose associated UI elements are located at a distance bigger than half of a UI window's width or height (e.g., 500 pixels for 1000×1000 pixels pages).

(2) num_rd: the number of reverse-directional actions in $a_s$; if an action's UI element 116 is located on the top or on the left of the UI element 116 of the preceding action in the sequence, the action is considered reverse-directional.

(3) tasksim: the similarity between words in q and texts present in the current state w. Rewards are based on task similarity are designed to encourage the agent to navigate to and stay in webpages "relevant" to the task description.

(4) parsim(p): the similarity between a parameter p in q and texts present in the current state w.

For example, consider a query 102 of "Estimate ride fare from 1$^{st}$ Avenue, New York [start location] to Central Park [end location] and a URL 104 of a ride-sharing website called "ridesharing.com." The bracketed "start location" and "end location" are annotated parameters that are added to the query 104 after the query parser 314 performs semantic analysts. In this example, the reward module 318 determines: (i) whether the parameter value $p_{val}$ (e.g., "Central Park") has high similarity with any text $t_j$ in w, (ii) whether the parameter's annotation $p_{ann}$ (e.g., "end location") or any of the surrounding text of $p_{val}$ in q (e.g., "to") has high similarity with any text $t_j$ in w, and (iii) whether $t_i$ and $t_j$ correspond to UI elements that are spatially close (e.g., whether the drop-off location text box may appear next to a label "To" and whether in q the word "to" precedes the drop-off value "Central Park").

Similarity between text in the query 102 and the current state w of a webpage 114 is computed, in some examples, in the following manner, between text $t_1$ and text $t_2$:

$$\text{sim}(t_1, t_2) = \max\{\text{sim}_{1\text{-}gram}(t_1, t_2), \text{sim}_{n\text{-}gram}(t_1, t_2), \text{sim}_{date}(t_1, t_2), \text{sim}_{number}(t_1, t_2)\}$$

where $\text{sim}_{1\text{-}gram}$, $\text{sim}_{n\text{-}gram}$, $\text{sim}_{date}$, and $\text{sim}_{number}$ are the similarity between $t_1$ and $t_2$ by considering the inputs as single word units (1-gram), multi-word units (n-gram), dates, or numbers, respectively. Additionally, some embodiments compute a Levenshtein distance (e.g., minimum number of edits to transform one string into another) between the two texts.

Often, however, a webpage contains misleading text. So computing the similarity between q and all texts in w is not always ideal. For example, a hyperlink "Mobile" may not signify the webpage 114 containing it is about mobile phones. On the other hand, limiting similarity to texts associated with actionable UI elements (e.g., label of a button) may be too restrictive. Some embodiments compromise between the two by reducing a webpage's content to what more likely represents its functionality. In some embodiments, the reward module 318 assigns $e \in w^* \subseteq w$ if e is: (i) a non-interactable element (e.g., title, text box's label, etc.) associated with "short" text (i.e., not a paragraph longer than a predetermined number of words, and not a list); or (ii) an element which was subject to a previous interaction in current and previous webpages 114. To accommodate this, value q* is used and defined as q with parameters and prepositions omitted, in some embodiments. This allows task$_{sim}$ to be calculated in the following manner:

$$\text{tasksim} = \text{mean} \{\max \{\text{sim}\{tw, e_{txt}\}\}\}$$

$$tw \in q^* \quad e \in w^*$$

where sim(tw, $e_{text}$) is the similarity between each task word tw in q* and the text associated with each e in w*.

To compute parsim, the reward module 318 assumes: (i) sv (p, e)=θ*sim($p_{val}$, $e_{text}$), the similarity between a parameter's value $p_{val}$ and $e_{text}$, scaled by a factor θ³, and (ii) $s_m$(p, e)=sim($p_{metadata}$, $e_{text}$), the similarity between a parameter's metadata $p_{metadata}$ (i.e., p's annotations and words surrounding p in q) and $e_{text}$. This allows parsim to be defined in the following manner:

$$parsim(p) = \max_{e_i,e_j, \in w*} \left\{ s_v(p, e_i) + \frac{Sv(p, e_j) * sm(p, e_j)}{1 + \lambda * dist(e_i, e_j)} \right\}$$

where λ is a hyperparameter to scale the spatial distance.

For example, consider again the example query 102 "Estimate ride fare from . . . " and the URL 104 is www.rideshare.com. Assuming $a_s$=<$a_1$, $a_2$, $a_3$>, where $a_1$=type($e_{a1}$, 1st Ave, New York), $a_2$=type($e_{a2}$, Central Park), $a_3$=click(ea3), $e_{a1}$=eEnter pick-up location, $e_{a2}$=eEnter drop-off location, and $e_{a3}$=eget estimate, the reward indicators are as follows:

(1) num_ld=0 because all action pairs in <$a_s$> are spatially close;
(2) num_rd=0 because there is no reverse-directional a in $a_s$;
(3) tasksim: q* is "Estimate ride fare start location end location"; and
(4) parsim(pend location) is highest for $e_i$=$e_j$=$e_{a2}$ because: (a) the parameter's value ("Central Park") and the text entered in ea2 exactly match (thus sv=0.7), and (b) the placeholder text "Enter drop-off location" associated with ea2 has high similarity with the parameter's annotation "end location" ($s_m$=0.89 for ea2). Hence, parsim(pend location)=1.32. The same considerations hold for parsim(pstart location).

The task-webpage similarity takes into account whether the new state of the webpage 110, after a particular UI element 116 interaction, contains textual content and/or actions that also have associated some classifying text (e.g., a button label) that matches or is semantically similar to the language of the query 102, such as to the text words, parameters, or parameter annotations of the query 102. In other words, actions for engaging UI elements 116 that produce webpages 114 with text similar to or the same as the query 102 are incremented in score. For example, a task agent 110 trying to estimate a rideshare may be incremented if an action it takes produces a webpage with a UI button labeled "Click to Estimate."

Using the above reward indicators, the reward module 318 defines the cumulative reward function R(q,w, as) as follows:

$$R(q, w, as) = w_{dist} * num_{ld} + w_{dir} * num_{rd} + w_{task} * task_{sim} + w_{par} * \sum_{p \in P} parsim(p) - k$$

where P is the set of parameters in q, and wdist<0, wdir<0, and wtask>0 and wpar>0 are weights that we empirically learned. The discount factor k is a step penalty (−1 for each action taken, except for submit-like actions such as form submit buttons or "Enter" key presses) that encourages the agent to discover short paths. To correctly reward tasks spanning multiple webpages 114, if the last-executed action leads to a webpage transition, the reward accumulated so far is adjusted. If the action that caused the page transition is a "submit" action, then it is assumed that the agent is making progress towards completing the task, thus the reward accumulated so far is kept. Otherwise, it means that the agent has dropped the ongoing task, hence, the reward accumulated in previous steps is cleared.

Upon every action the task agent 110 takes, reward module 318 returns a partial reward computed as the increment of the cumulative reward. In some examples, the reward given to the task agent 110 for the i-th step is:

$r_i$=R(q,w, $as_i$)−R(q,w, $as_{i−1}$).

Having covered some specific examples of how rewards are assigned, other embodiments will use different algorithms and techniques to score the progress of the task agent 110 to develop a tasklet 118 answering the query 102.

The RL module 320 provides reinforced learning using the reward models described herein. In some embodiments, the RL module 320 implements a hierarchical policy, whereby a master task agent 110 is created and controls a subset of task-specific sub task agents 110 (referred to herein as sub-task agents 110). In some embodiments, Q-learning is used to learn the master task agent 110. This may be done by training a function Q to represent the long-term value of taking action a in s. The function is represented as a mapping table, in which each key is a state-action pair <s, a> and the value is Q(s, a). An action is uniquely identified with its type, value, and attributes of its target UI element (DOM attributes,Xpath,X/Y location, identifiers, etc.), and a state is uniquely identified with the identifiers of all actions in the state, the DOM tree of the associated page, the screenshot of the associated page, and content appearing on the associated page. To train the Q function, the master task agent 110 is allowed to try for N episodes and take M steps in each episode. At the beginning, Q is initialized to 0 and the agent explores the state randomly. The master task agent 110 continuously updates Q based on the collected experience and gradually moves from exploration (choosing actions randomly) to exploitation (choosing actions based on the Q values).

To navigate large state spaces such as websites, a hierarchical policy can be adopted where the master agent 110 orchestrates interactions with the page and navigation across pages, and one or multiple sub-agents 110 carry out specialized interactions such as filling in forms, entering dates in a date picker, carrying out search actions, logging in or logging out from a website, etc.

To train the sub-task agents 110, such as form filling sub-agents, some embodiments use a deep Q-network (DQN). DQN is similar to Q-learning except the value function Q(s, a) is approximated with a deep neural network (DNN) instead of a mapping table. For sub-task agents 110 filling in forms DQN is used because a DNN may capture commonalities between state-action pairs which are common in forms. For example, the action of typing a pick-up location and typing a drop-off location into the correct text boxes have similar representations in a DNN model, so that the experience about one can be used to learn the other. In Q-learning, each state-action pair is represented as a unique identifier, thus each step must be learned separately.

Q learning and DQN are but two examples for training the sub-task agents 110. Other algorithms and techniques may be used.

An advantage of using sub-task agents 110 for forms is that as interacting with a form does not lead to page re-directions (that are unpredictable), embodiments explore a form by simulating its possible state transitions. For example, the state and reward obtained after executing type(e, "Central Park") in s can be simulated by simply setting the value of e to "Central Park" in s. Through simulation, many more episodes may be run to train the sub-task agents 110.

The post-processing module 322 analyzes the scores 112 of the task iterations 110s to identify correct tasklets 118a-n. Based on the final cumulative score 112, a top number of highest-rewarded task agent run 111a-n are selected (e.g., 5, 10, 20, 100, etc.). Task agent runs 111a-n that accumulated negative scores may be discarded if a new action sequence is successfully replayed and yields a higher reward. Possibly missing "submit" actions usually occurring at the end of a task execution (e.g., missing enter action) are automatically injected and tested, in some embodiments. And, then, the final sequence of actions is replayed to verify a tasklet 118 works. The final output consists of at most k-number of tasklets 118a-n, ranked by their cumulative scores 112a (or rewards). Not all task agent runs 111a-n yield tasklets 118a-n. As discussed, only the k-number of task agent runs 111a-n, based on their scores 112a-n may be taken, and negative-scoring task agent runs 111a-n are discarded.

Once the tasklets 118a-n are generated, one may be selected and stored as a UI script to perform the query 102. This is shown as the answer tasklet 118n, due to the fact that tasklet 118n was based on task agent run 110n having the highest score 112n. In effect, the tasklets 118-n generated from the task agent runs 111a-n of the task agent 110 produce an executable UI script (answer tasklet 118n in the above example) that may be used for numerous purposes. The answer tasklet 118n may be automatically executed for the user 106, stored in cloud memory to indicate a learned action as pan of a search-engine web crawl, stored in a robotics library, or used for myriad other uses. Determining the most likely tasklet 118 for a given query 102 in real time has far-reaching implications that directly aid search, robotics, automation, virtual assistants, and a host of other end uses.

Additionally or alternatively, in some examples, the post-processing module 322 analyzes the actions of the task agent runs 111a-n and learns the sequence of actions that most positively incremented the scores 112a-n, and then creates a task template (shown as 118z in FIG. 4) consisting of the actions that most incremented the scores 112. For example, task agent run 111a may have 3 of 10 actions with positive rewards, task agent run 111b may have 2 of 10, and task agent run 111c may have 4 of 10. The post-processing module 322 analyzes the positive-reward actions, determines whether any were performed by more different task agent runs 111a-c (which strongly correlates to a correct engagement of a UI element 118), and then creates a tasklet template 118z comprising only positive-reward actions. Such a tasklet template 118z may be set as the answer tasklet 118n, which may be used as a UI script to perform the task of the query 102 in a parametrizable way.

Figure 4:
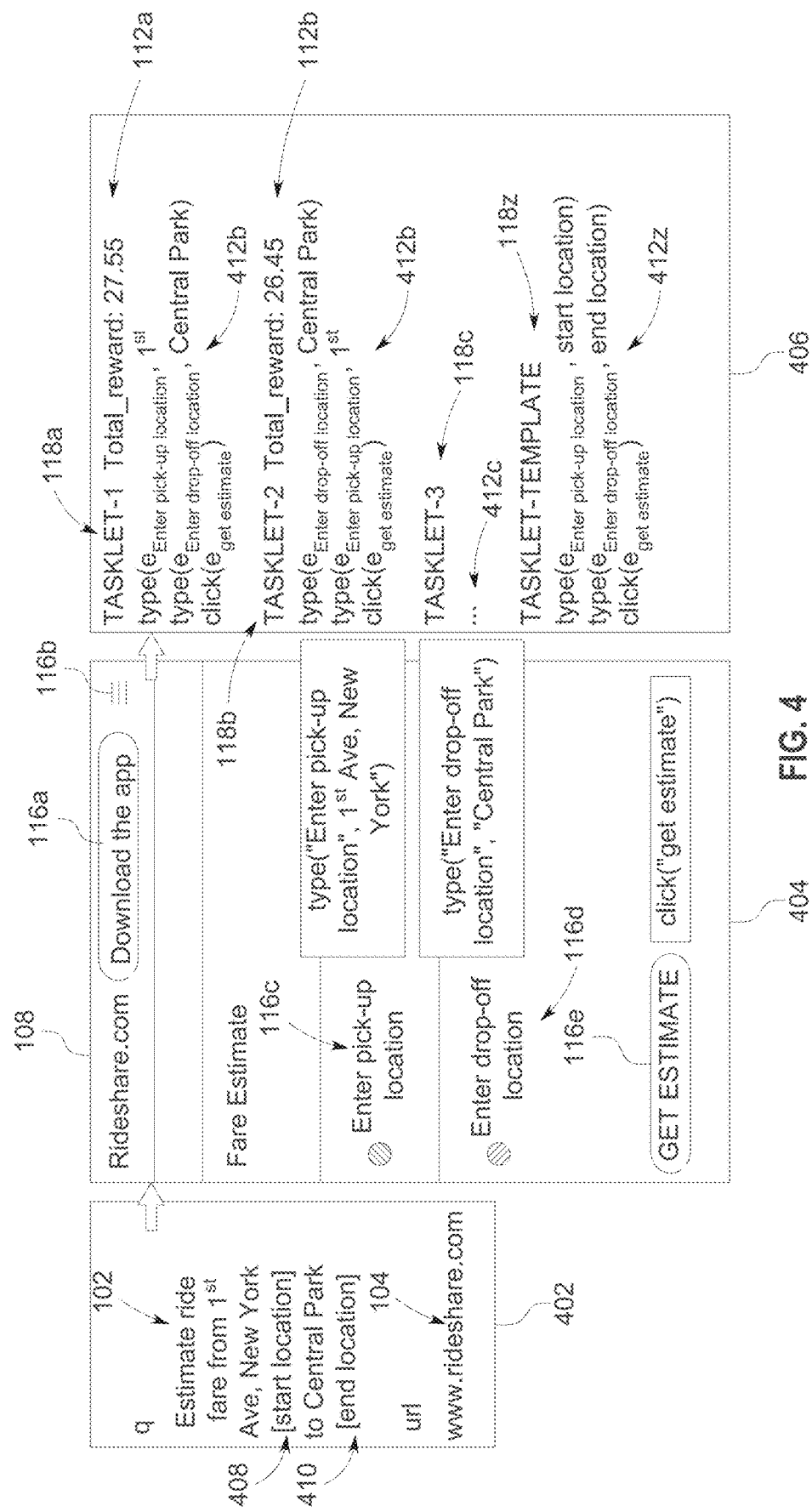
FIG. 4 is a user interface (UI) diagram illustrating a sequence of UI windows showing tasklets being created to answer a query for an action on a website, according to some of the disclosed embodiments.

FIG. 4 illustrates a sequence of UI windows 402-406 showing three tasklets (tasklets 118a-c) being created to answer a query 102 for action on a website 100, according to some of the disclosed embodiments. In this example, the query 102 ("Estimate ride fare from 1$^{st}$ Ave, New York to Central Park") is submitted to the tasklet service 108 along with a URL 104 (www.rideshare.com) for a ride-share application. This is shown in the UI window 402, and both may be submitted through the digital assistant 220 or another input in the tasklet application 222.

In some examples, the query parser 314 analyzes the text of the query 102 and assigns parameter annotations $p_{ann}$ 408, 410 to the text recognized as a particular type of text. In the shown example, start and end locations were identified and annotated as $p_{ann}$ 408 and $p_{ann}$ 410, respectively. Myriad other types of annotations may be identified and applied. Examples include without limitation, names, addresses, cuisines, times, dates, people, titles, phone numbers, contacts, or any other text that is recognizable through semantic or syntactic analysis.

UI window 404 shows the ride-sharing website 108, which has several engageable UI elements 116a-e. Specifically, the UI elements 116a-e include an application download button 116a, a menu button 116b, a text field 116c for entering a pick-up location, a text field 116d for entering a drop-off location, and a button for obtaining a ride estimate 116e. In operation, the task agent 110 performs one or more task agent runs 111a-n take the text of the query 102 and begin engaging the UI elements 116a-e to form the tasklets 118a-c shown in UI window 406. For example, a task agent run 111 may enter text of the $p_{ann}$ 408 (start location) in the text field 116c for entering a pick-up location, enter text of the $p_{ann}$ 410 (end location) in the text field 116d for entering a drop-off location, and/or select the estimate button 116e.

Task agent runs 111 may perform different combinations of actions on the UI elements of the illustrated website 100, and the resultant states (i.e., webpages) that such actions lead to are analyzed based on the previously discussed action locality, action directionality, and task-webpage similarity features considered by the reward module 318 in order to assign scores 112 (or rewards) to the task agent runs 111. The action locality refers to the position of a UI element 116 being executed relative to other UI elements 116 on the webpage 114, and in some examples, and a positive reward is when the distance therebetween is within a particular distance threshold or a negative or neutral reward is assigned if not. The action directionality refers to the direction that an executed UI element 116 proceeded in relation to a previous UI element 116, and a positive reward is assigned when the directionality flows in line with the way users read content (e.g., left to right for English-speaking text) or a negative or neutral reward is assigned if not. Finally, the task-webpage similarity refers to semantical closeness of text on the new state of a webpage that from the UI element 114 being executed relative to the text of the query 102. If the new state of the webpage has text that is the same or semantically close to the text of the query 102, a positive reward is assigned, and a negative or neutral reward is assigned if not.

For example, one task agent run 111a may click the application download button 116a, which directs the website 100 to a new webpage 114 for downloading a mobile version of the ride-sharing application, and thus nothing to do with actually estimating a ride. This action is then scored negatively by the reward module 318 because the new state (i.e., the webpage 114 for downloading the application) has little to no text that associated with the query 102. Another task agent run 111b may select the menu button 116b after inputting the start location in the input text field 116c for the pick-up location, resulting in a negative score 112 (or reward) because the menu button 116b is positioned up and to the right of the input text field 116 in the opposite direction that users typically read, or consume, a web page (e.g., violate action directionality). Also, the same action sequence may violate action locality because the menu button 116b and the input text field 116c are beyond a threshold distance from each other on the UI screen 404. These are just some examples of how actions in the UI elements 116*a-e* are scored.

The tasklet service 108 generates a list of tasklets 118 from the task agent runs 111*a-n* and their corresponding scores 112. UI window 406 shows an example of the generated tasklets 118*a-c,* ranked according to their corresponding scores 112. Each tasklet comprises a reward score 112 and a sequence of actions that were performed (412). More specifically, Tasklet-1 118*a* includes actions 412*a* and score 112*a,* tasklet-2 118*b* includes actions 412*b* and score 112*b,* tasklet-3 118*c* includes actions 412*c* (which are not shown for clarity) and score 112*c* (not shown as well), and so on. The tasklets 118*a-c* are ranked according to their scores 112, and an answer tasklet 118*n* may be selected based on the scores 112. Alternatively, the answer tasklet 118*n* may be a template tasklet 118*z* that is generated based on a set of positive actions 412*z* learned from the different tasklets 118*a-c*.

In some embodiments, the answer tasklet 118*n* is a highest scored tasklet 118, such as Tasklet-1 118*a* in the depicted example. Alternatively, a template tasklet 118*d* is created and assigned as the answer tasklet 118*n*. The template tasklet 118*d* is created by the post-processing module 322 analyzing the learning trace of the task agent run 111 (consisting of N episodes) to identify correct tasklets 118*a-n*. On the based on the final cumulative score 112, a top number of highest-rewarded task agent runs 111*a-n* are selected (e.g., 5, 10, 20, 100, etc.). Task agent runs 111*a-n* that accumulated negative scores may be discarded if a new action sequence is successfully replayed and yields a higher reward. Possibly missing "submit" actions usually occurring at the end of a task execution (e.g., missing enter action) are automatically injected and tested, in some embodiments. And, then, the final sequence of actions is replayed to verify a tasklet 118 works. The final output consists of at most k-number of tasklets 118*a-n,* ranked by their cumulative scores 112*a* (or rewards). Not all task agent runs 111*a-n* yield tasklets 118*a-n*. As discussed, in some embodiment, only the k-number of task agent runs 111*a-n,* based on their scores 112*a-n,* may be taken, and negative-scoring task agent runs 111*a-n* are discarded.

Figure 5:
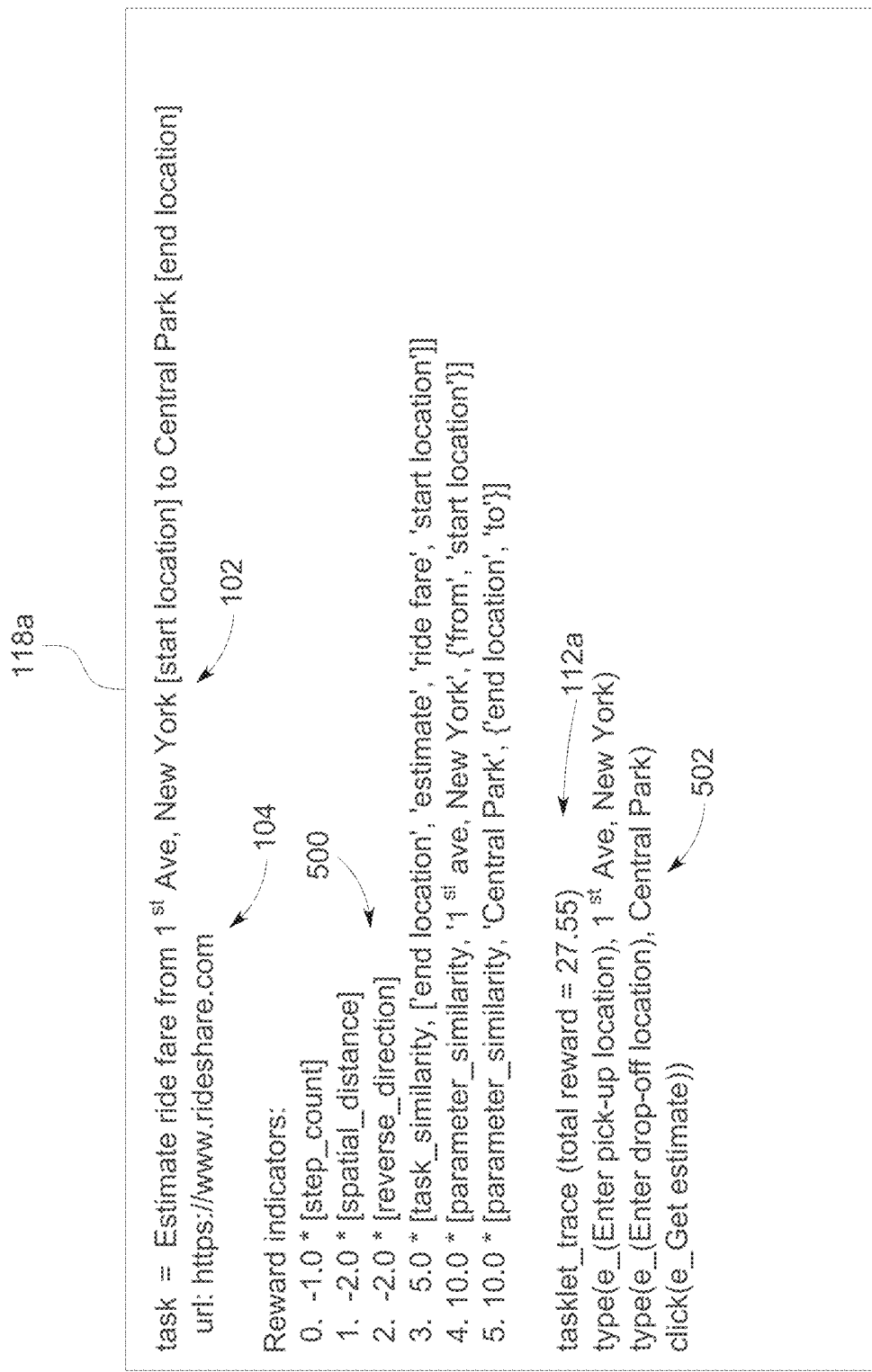
FIG. 5 is a UI diagram illustrating relevant scoring details of a tasklet, according to some of the disclosed embodiments.

FIG. 5 illustrates a UI diagram showing relevant weights that are applied to rewards of the tasklet 118*a,* according to some of the disclosed embodiments. In some embodiments, weights are applied to rewards awarded to actions of the task agent runs 111 based on the particular result. Reward weights 500 are applied to different reward amounts. In the shown example, six types of reward weights (0-5) are used to adjust the rewards associated with step count (weight 0), spatial distance (weight 1), reverse direction (weight 2), task similarity (weight 3), and different the similarities of resultant webpages 114 compared to the different text in the query 102 (weights 4 and 5). To illustrate further, the shown embodiment illustrates weights 500 being assigned to the count 112 in the following manner. A first reward weight of −1.0 is applied to a reward based on a step count. A second reward weight of −2.0 is applied to a reward based on the spatial distance between UI elements 116*a* exceeding a predetermined length. A third reward weight of −2.0 is applied to the reward because the UI element 116 is in the reverse direction from a previous action. A fourth reward weight of 5.0 applied to the reward because the resultant webpage had tasks that were similar (tasksim) to the terms of the query 102. A fifth reward weight of 10.0 applied to the reward because the resultant webpage had parameters that were similar (parasim) to the query 102. Additionally, the UI

500 may also show the tasklet trace 502, representing the actions performed by the underlying task agent run 111 that created the tasklet 118*a*.

Figure 6:
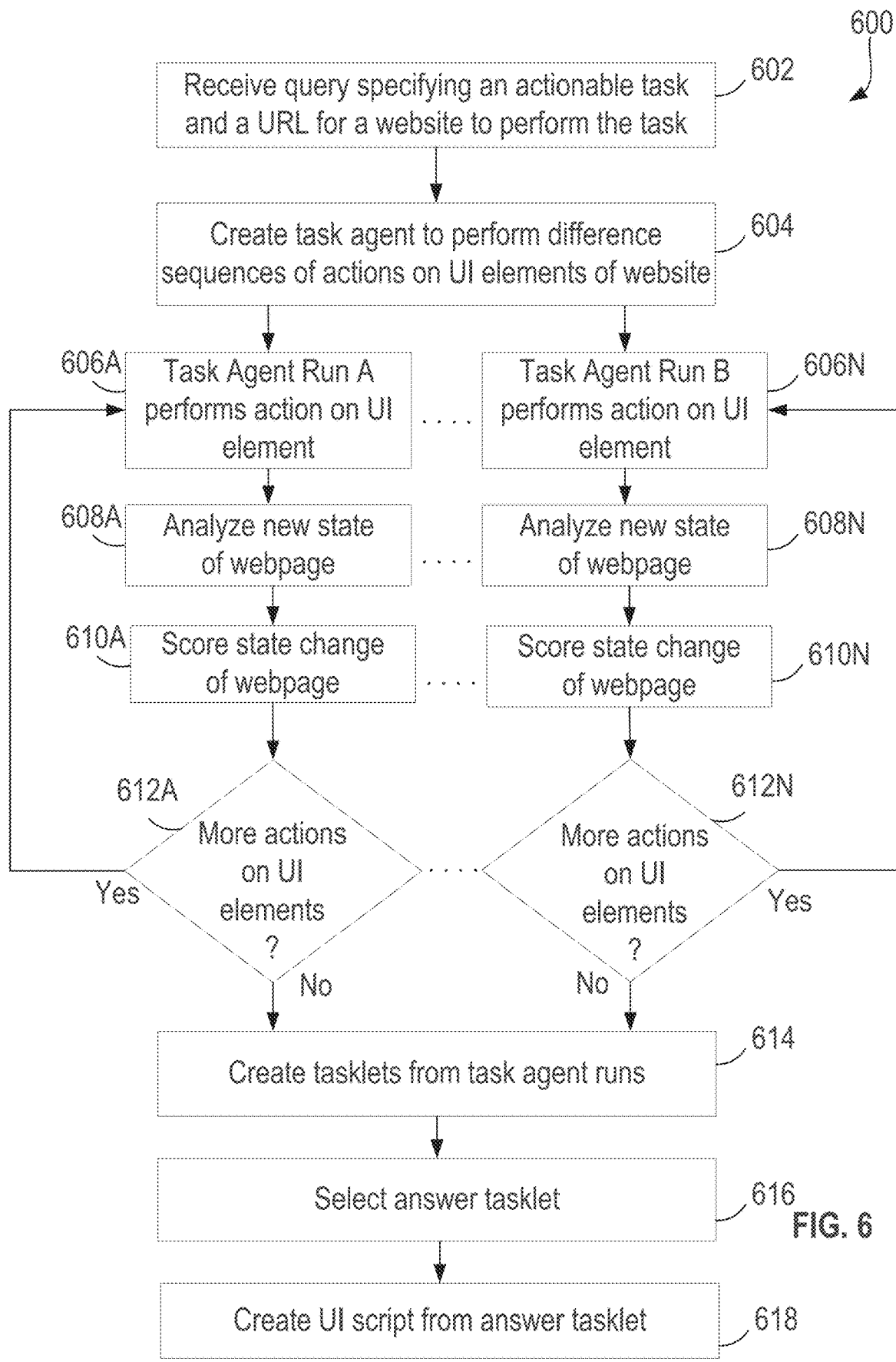
FIG. 6 is a flowchart diagram of a workflow for learning the correct UI script to answer an input query, according to some of the disclosed embodiments.

FIG. 6 is a flowchart diagram of a workflow 600 for learning the correct UI script to answer an input query, according to some of the disclosed embodiments. Initially, a query requesting an actionable task to be performed (e.g., "Estimate ride fare from 1st Ave, New York to Central Park") and a URL 104 (e.g., www.rideshare.com) for a website 100 to perform the task are received, as shown at 602. A task agent is created to perform different sequences of actions on UI elements in the various webpages of the website, as shown at 604. For example, tens, hundreds, thousands, or any other number of task agent tuns 111 may be executed. To illustrate this, workflow 600 shows two different iterations for Task Agent Run_A and Task Agent Run_B; though, any number of task agent runs 111 may be used. The two different include the same operational elements, just performed for different task agent runs 111.

Each task agent run 111 performs an action on a UI element 116, as shown at steps 606A,B. These may include clicking a button, inputting text in a text field, engaging a drop-down menu, selecting a date, clicking play on a video, or any other action on a webpage. These actions may either change the webpage or direct to a new webpage. These changes are monitored and considered new states of the webpage 114. For example, if a task agent run navigates to a webpage with a date selector and selects a date, a first state of the webpage is detected without the date and a second state of the webpage is detected after the date has been entered. In another example, if a user selects a button to make a reservation for a restaurant, a first state is detected of the webpage where the reservation button is located and a second state is detected of a second webpage where confirmation that the reservation has been made is provided. Thus, as illustrated by these two non-limiting examples, execution of UI elements changes a webpage or directs to a new webpage, which are both considered new states to be analyzed.

As shown at 610A,B, the state changes to the webpage—caused by execution of the UI by the task agent runs—are scored. In some examples, these scores 112 include a sum of rewards (which may be weighted) that are issued by the reward module based on the action locality, action similarity, and/or task-webpage similarity parameters discussed above. In some examples, the rewards are added or subtracted from a running score 112 for each task agent run 111. In other words, the scores 112 are incremented or decremented based on the states of the webpages 114 and the aforesaid action locality, action similarity, and/or task-webpage similarity parameters. This sequence of executing a UI element 116, analyzing the new slate of the webpage 114, and scoring the new state is sweated after each UI element 116 in the task agent runs 111, as shown by the decision boxes 612A,B.

Once the task agent 110 finishes executing actions on the UI elements 116, tasklets 118 are created from the task agent runs 111, as shown at 614. The tasklets 118 may include the scores of the task agent runs 111 and a trace of the actions performed. An answer tasklet 118*n* is then selected from the tasklets 118, as shown at 614. In some examples, the answer tasklet 118*n* includes the task agent run 111 with the highest score. Alternatively, the answer tasklet 118*n* includes a sequence of actions with the highest scores from multiple task agent runs 111 (e.g., the aforementioned task template 118*z*). The answer tasklet 118*n* may then be executed as a UI script for a user, IoT device, robot, or the like. Additionally or alternatively, the answer tasklet 118*n* may be stored in a knowledge repository for a search engine as the most-likely action for a given task. Numerous other uses exist for the answer tasklet 118n.

Figure 7:
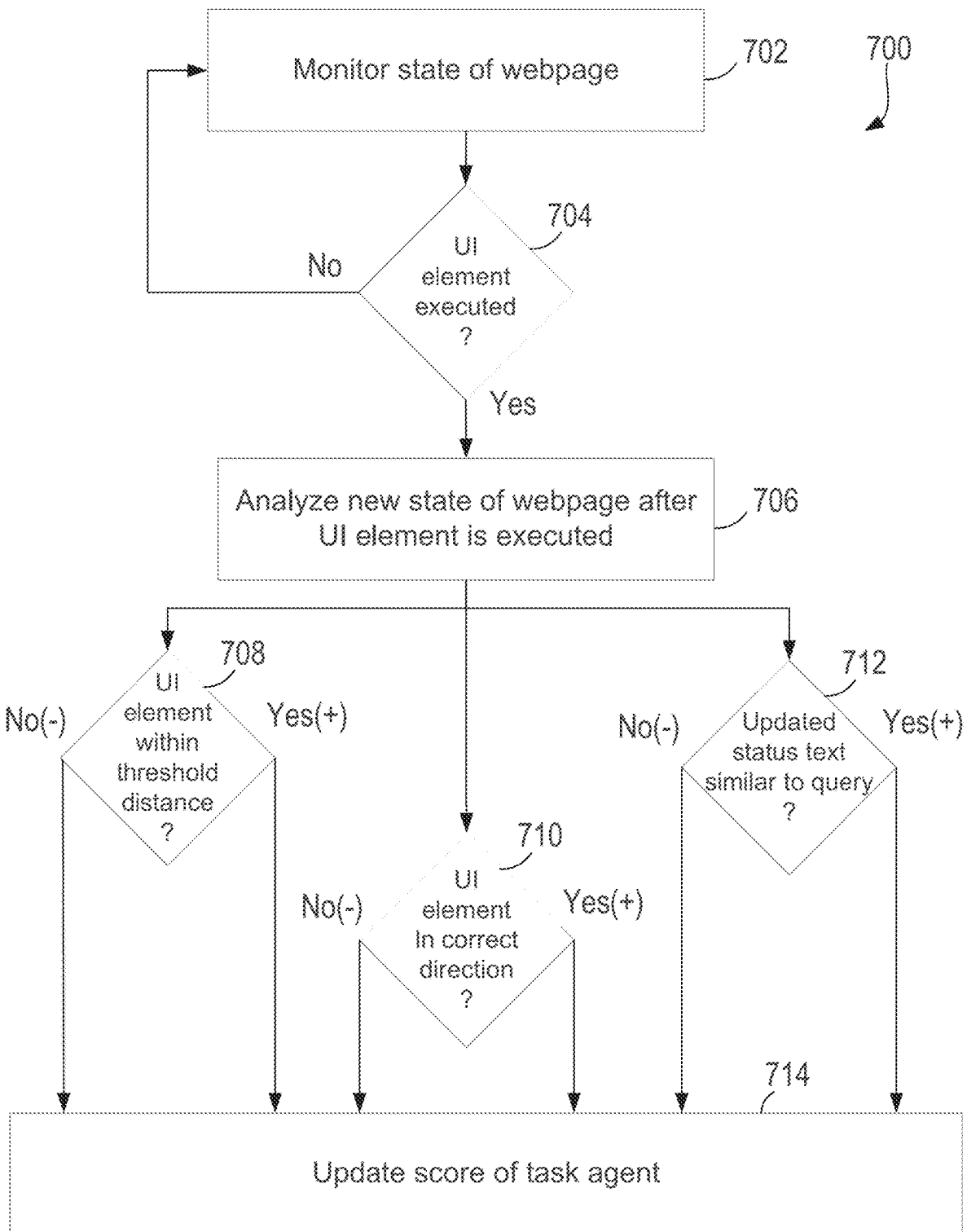
FIG. 7 is a flowchart diagram illustrating a workflow for scoring a task agent run, according to some of the disclosed embodiments.

FIG. 7 is a flowchart diagram illustrating a workflow 700 for scoring a task agent run 111, according to some of the disclosed embodiments. Specifically, workflow 700 illustrates one example of how a task agent is scored by the reward module. This workflow 700 may be used for all task agent runs 111a-n to generate and update scores 112a-n indictive of whether the actions being performed by the task agent runs 111a-n are fulfilling a given query. Also, the workflow 700 may be executed for every action performed by the task agent 110 on a UI element 116.

Initially, the state of a webpage 114 is monitored, or otherwise captured, before an action on a UI element 116 is performed during a task agent run 111, as shown at 702. When the UI element action is executed by the task agent 110 (e.g., the task agent 110 clicks a button, picks a date, enters text, plays a video, or performs another action on the webpage), a new state of the webpage 114 after the UI element action is captured and analyzed, as shown at 706. This new state may show that the webpage 114a has changed from the action or that the action has triggered the launching of a new webpage 114b.

Rewards are issued to the task agent runs 111a-n based on the new state of the webpage 114b, as shown by the different decision boxes 708, 710, and 712. These decision boxes 708-712 correspond to the previously discussed action locality, action directionality, and task-webpage similarity parameters. In particular, the decision boxes 798-712 show how the scores of the task agent runs 111a-n are incremented or decremented, showing a positive increment for all Yes paths and a negative decrement for all No paths. Also, as mentioned above, these rewards may be weighted based on different weighting parameters (e.g., step count, spatial distance, reverse direction, task similarity, parameter similarity, etc.).

Looking at box 708, the score of the task agent run 111 is incremented if the UI element 116 that was executed was within a threshold distance on the webpage from another UI element 116 that was previously executed, or decremented if beyond the threshold distance. For example, if a selected button was in the bottom 10% of the webpage, but a previous action of entering text was in the top 10%, exceeding the threshold distance, the score 112 is reduced by a certain value—or, put another way, a negative reward is applied to the score 112 of the task agent run 111.

Looking at box 710, the score of the task agent run 111 is incremented if the UI element 116 that was executed continues in the direction that user typically consumes content, given the language of the webpage, or decremented if not. For example, if the webpage 114 is in English (i.e., read from left to right and top to bottom), a text field that is above and to left of a previous action would result in a negative award being applied to the score 112 of the task agent run 111.

Looking at box 712, the score of the task agent run 111 is incremented if the new state of the webpage 114 produced from the executed action of the UI element includes text or other content that is the same (or semantically close) to the text of the query. If not, the score 112 is decremented. For example, if the query is to "Book a car" on specific a ride-sharing application and the updated state of the webpage is a confirmation that a car is booked, a positive reward may be added to the score because the state includes the term "booked" and "car," which were present in the query. The different techniques discussed above are used to determine similarity between the new state of the webpage and the query.

Thus, these three decision boxes 708-712 illustrates ways in which positive and negative rewards are applied to the task agent runs as they executed different UI elements. As shown at 714, the positive and negative rewards are used to update the scores. And, previously discussed, these scores of the task agent are used to create tasklets 118 from which a UI script (e.g., answer tasklet 118n) is selected for the query 102.

Other signals than the three decisions boxes 708-712 may be considered, either alternatively or additionally. In some embodiments, task coherence is detected and rewarded. When executing a task, previously entered parameters are usually summarized as the task progresses in subsequent pages (e.g., getting to a confirmation page that summarizes all the details of the booking). The content on a webpage 114 may be analyzed as to whether it includes text that summarizes details related to the query 102. Numerous other factors may be used. Thus, the decision boxes shown in FIG. 7 are extendable to account for various different parameters.

ADDITIONAL EXAMPLES

Some examples are directed to the following clauses.

1A. A method for building a UI script to execute a task described by a query on a website, the method comprising:
receiving the query and the uniform resource locator (URL) of the website, the query specifying a task to be performed and the website comprising one or more webpages with the UI elements;
creating a task agent to perform task agent runs comprising different sequences of actions of the UI elements in the one or more webpages;
analyzing states of the webpages after execution of each action of the UI elements performed in the task agent runs;
assigning scores to the task agent runs based on the states of the webpages after the actions of the UI elements are performed; and
generating the UI script for executing the task described by the query based on the assigned scores of the task agent runs.

2A. The method of claim 1, wherein the query is a natural language query.

3A. The method of claim 1, wherein the query is submitted by a user through a digital assistant on a client computing device.

4A. The method of claim 1A, wherein said generating the UI script for executing
the task described by the query based on the assigned scores comprises:
generating tasklets from the task agent runs, the tasklets comprising sequences of the actions performed by the task agent runs on the UI elements;
assigning the scores of the task agent runs to the tasklets;
selecting an answer tasklet from the tasklets based on the scores; and
storing the answer tasklet as the UI script.

5A. The method of claim 1A, wherein the scores are assigned to the task agent runs based on similarity of text in the one or more webpages after an action is performed relative to text in the query.

6A. The method of claim 1A, wherein the scores are assigned to the task agent runs based on action locality of an executed UI element relative to another UI element in the one or more webpages.

7A. The method of claim 1A, wherein the scores are assigned to the task agent runs based on an action directionality of an executed UI element relative to a previously executed UI element in the one or more webpages.

8A. The method of claim 1A, wherein the query is submitted by a developer through a tool for process automation on a client computing device.

9A. The method of claim 8A, further comprising:
analyzing semantics of the query;
recognizing text of the query;
assigning a parameter to the recognized text of the query; and
engaging at least one of the UI elements using the assigned parameter.

10A. The method of claim 1A, further comprising executing the UI script by an Internet of Things (IoT) device or a robot.

11A. The method of claim 1A, further comprising training the task agent to be a master task agent.

12A. The method of claim 11A, further comprising training the task agent to interact with additional sub-task agents to perform portions of the task agent runs.

13A. The method of claim 11A, wherein the scores assigned reward that are weighted based on at least one of the actions of the UI elements.

14A. A computing device for building a UI script to answer a query for a website, the computing device comprising:
memory embodied with instructions for generating a task agent to perform various task agent runs of actions on UI elements in webpages of the website; and
one or more processors programmed for:
receiving the query and the uniform resource locator (URL) of the website, the query specifying a task to be performed and the website comprising one or more webpages with the UI elements;
creating a task agent to perform task agent runs comprising different sequences of actions of the UI elements in the one or more webpages;
analyzing states of the webpages after execution of each action of the UI elements performed in the task agent runs;
assigning scores to the task agent runs based on the states of the webpages after the actions of the UI elements are performed; and
generating the UI script for executing the task described by the query based on the assigned scores of the task agent runs.

15A. The computing device of claim 14A, wherein said generating the UI script for answering the query based on the assigned scores comprises:
generating tasklets from the task agent runs, the tasklets comprising sequences of the actions performed by the task agent in the UI elements;
assigning the scores of the task agent runs to the tasklets;
selecting an answer tasklet from the tasklets based on the scores; and
storing the answer tasklet as the UI script.

16A. The computing device of claim 14A, wherein the one or more processors are further programmed for:
training the agent to be a master task agent; and
controlling the master task agent to direct sub-task agents to perform at least one action in the UI elements.

17A. The computing device of claim 14A, wherein the one or more processors are further programmed for:
analyzing semantics of the query;
recognizing text of the query;
assigning a parameter to the recognized text of the query; and
engaging at least one of the UI elements using the assigned parameter.

18A. The computing device of claim 14A, wherein the query is a natural language query.

19A. The computing device of claim 14A, wherein the scores are assigned based on text in the webpages after an action of a UI element is executed relative to text of the query.

20A. One or more computer-storage memory embodied with computer-executable instructions for building a UI script to answer a query for a website, the one or more computer-storage memory comprising:
a query parser configured to receive the query and the uniform resource locator (URL) of the website, the query specifying a task to be performed and the website comprising one or more webpages with the UI elements;
an agent generator configured to create a task agent to perform different task agent runs comprising sequences of actions of the UI elements in the one or more webpages
a reward module configured to analyze states of the webpages and assign scores to the task agent runs based on the states after execution of each action of the UI elements performed by the task agent;
a reinforcement learning (RL) module configured to select actions for the task agent runs based on the states of the webpages and the scores; and
a post-processing module configured to analyze the scores of the task agent runs and select an answer tasklet that answers the query.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for building a UI script to execute a task described by a query on a website, the method comprising:
receiving the query and the uniform resource locator (URL) of the website, the query specifying a task to be performed and the website comprising one or more webpages with the UI elements;

creating a task agent to perform task agent runs comprising different sequences of actions of the UI elements in the one or more webpages;

analyzing states of the webpages after execution of each action of the UI elements performed in the task agent runs;

assigning scores to the task agent runs based on the states of the webpages after the actions of the UI elements are performed, wherein the states of the webpages include similarities of the webpages and text of the query after an action is performed; and generating the UI script for executing the task described by the query based on the assigned scores of the task agent runs.

2. The method of claim 1, wherein the query is a natural language query.

3. The method of claim 1, wherein the query is submitted by a user through a digital assistant on a client computing device.

4. The method of claim 1, wherein said generating the UI script for executing the task described by the query based on the assigned scores comprises:

generating tasklets from the task agent runs, the tasklets comprising sequences of the actions performed by the task agent runs on the UI elements;

assigning the scores of the task agent runs to the tasklets;

selecting an answer tasklet from the tasklets based on the scores; and storing the answer tasklet as the UI script.

5. The method of claim 1, wherein the scores are assigned to the task agent runs based on action locality of an executed UI element relative to another UI element in the one or more webpages.

6. The method of claim 1, wherein the scores are assigned to the task agent runs based on an action directionality of an executed UI element relative to a previously executed UI element in the one or more webpages.

7. The method of claim 1, wherein the query is submitted by a developer through a tool for process automation on a client computing device.

8. The method of claim 7, further comprising:
analyzing semantics of the query;
recognizing text of the query;
assigning a parameter to the recognized text of the query; and
engaging at least one of the UI elements using the assigned parameter.

9. The method of claim 1, further comprising executing the UI script by an Internet of Things (IoT) device or a robot.

10. The method of claim 1, further comprising training the task agent to be a master task agent.

11. The method of claim 10, further comprising training the task agent to interact with additional sub-task agents to perform portions of the task agent runs.

12. The method of claim 1, wherein the scores assigned reward that are weighted based on at least one of the actions of the UI elements.

13. A computing device for building a UI script to answer a query for a website, the computing device comprising:

memory embodied with instructions for generating a task agent to perform various task agent runs of actions on UI elements in webpages of the website; and one or more processors programmed for:
receiving the query and the uniform resource locator (URL) of the website, the query specifying a task to be performed and the website comprising one or more webpages with the UI elements;

creating a task agent to perform task agent runs comprising different sequences of actions of the UI elements in the one or more webpages;

analyzing states of the webpages after execution of each action of the UI elements performed in the task agent runs;

assigning scores to the task agent runs based on the states of the webpages after the actions of the UI elements are performed, wherein the states of the webpages include similarities of the webpages and text of the query after an action is performed; and generating the UI script for executing the task described by the query based on the assigned scores of the task agent runs.

14. The computing device of claim 13, wherein said generating the UI script for answering the query based on the assigned scores comprises:

generating tasklets from the task agent runs, the tasklets comprising sequences of the actions performed by the task agent in the UI elements;

assigning the scores of the task agent runs to the tasklets;

selecting an answer tasklet from the tasklets based on the scores; and storing the answer tasklet as the UI script.

15. The computing device of claim 13, wherein the one or more processors are further programmed for:
training the agent to be a master task agent; and
controlling the master task agent to direct sub-task agents to perform at least one action in the UI elements.

16. The computing device of claim 13, wherein the one or more processors are further programmed for:
analyzing semantics of the query;
recognizing text of the query;
assigning a parameter to the recognized text of the query; and
engaging at least one of the UI elements using the assigned parameter.

17. The computing device of claim 13, wherein the query is a natural language query.

18. The computing device of claim 13, wherein the scores assigned are weighted based on at least one of the actions of the UI elements.

19. The computing device of claim 13, wherein the scores are assigned to the task agent runs based on an action directionality of an executed UI element relative to a previously executed UI element in the one or more webpages.

20. One or more computer-storage memory embodied with computer-executable instructions for building a UI script to answer a query for a website, the one or more computer-storage memory comprising:

a query parser configured to receive the query and the uniform resource locator (URL) of the website, the query specifying a task to be performed and the website comprising one or more webpages with the UI elements;

an agent generator configured to create a task agent to perform different task agent runs comprising sequences of actions of the UI elements in the one or more webpages;

a reward module configured to analyze states of the webpages and assign scores to the task agent runs based on the states after execution of each action of the UI elements performed by the task agent, wherein the states of the webpages include similarities of the webpages and text of the query after an action is performed;
a reinforcement learning (RL) module configured to select actions for the task agent runs based on the states of the webpages and the scores; and
a post-processing module configured to analyze the scores of the task agent runs and select an answer tasklet that answers the query.

* * * * *